(12) United States Patent
Bowman et al.

(10) Patent No.: US 11,198,460 B2
(45) Date of Patent: Dec. 14, 2021

(54) WAGON WITH COLLAPSIBLE FOOTWELL AND POSITION-LOCKING HANDLE

(71) Applicant: VEER GEAR, LLC, Milton, GA (US)

(72) Inventors: Andrew Bowman, Milton, GA (US); Brady Schroeder, Milton, GA (US)

(73) Assignee: VEER GEAR, LLC, Milton, GA (US)

( * ) Notice: Subject to any disclaimer, the term of this patent is extended or adjusted under 35 U.S.C. 154(b) by 0 days.

(21) Appl. No.: 16/686,454

(22) Filed: Nov. 18, 2019

(65) Prior Publication Data
US 2020/0079407 A1    Mar. 12, 2020

Related U.S. Application Data

(63) Continuation of application No. 15/453,329, filed on Mar. 8, 2017, now Pat. No. 10,507,857.

(60) Provisional application No. 62/307,726, filed on Mar. 14, 2016, provisional application No. 62/305,017, filed on Mar. 8, 2016.

(51) Int. Cl.
| | |
|---|---|
| B62B 3/02 | (2006.01) |
| B62B 9/12 | (2006.01) |
| B62B 7/12 | (2006.01) |
| B62B 7/00 | (2006.01) |
| B62B 3/14 | (2006.01) |
| B62B 5/06 | (2006.01) |

(52) U.S. Cl.
CPC .............. *B62B 3/02* (2013.01); *B62B 3/144* (2013.01); *B62B 3/1468* (2013.01); *B62B 7/008* (2013.01); *B62B 7/12* (2013.01); *B62B 9/12* (2013.01); *B62B 5/067* (2013.01)

(58) Field of Classification Search
CPC ......... B62B 3/02; B62B 3/144; B62B 3/1468; B62B 7/008; B62B 7/12; B62B 9/12
See application file for complete search history.

(56) References Cited

U.S. PATENT DOCUMENTS

| | | |
|---|---|---|
| 1,059,504 A | 4/1913 | Teppert |
| 2,563,995 A | 8/1951 | East |
| 2,767,996 A | 10/1956 | Seyforth |
| 2,879,072 A | 3/1959 | Rear et al. |

(Continued)

FOREIGN PATENT DOCUMENTS

| | | |
|---|---|---|
| CN | 203832526 | 9/2014 |
| DE | 202006012430 U1 | 10/2006 |

(Continued)

OTHER PUBLICATIONS

PCT/US2017/054739, "International Search Report and Written Opinion", dated Dec. 15, 2017, 14 pages.

(Continued)

*Primary Examiner* — James A Shriver, II
*Assistant Examiner* — James J Triggs
(74) *Attorney, Agent, or Firm* — Kilpatrick Townsend & Stockton LLP

(57) ABSTRACT

Consumer wagons are provided for carrying seated children and/or household cargo. In some embodiments, the wagons have a footwell for children carried in the wagon to place/rest their feet, and the footwell is repositionable between use position lowered relative to the wagon base and a collapsed/storage position closer to the wagon base. And in some embodiments, the wagons have a pull-handle that can be moved between different positions and that is lockable in multiple of the different positions.

39 Claims, 31 Drawing Sheets

(56) References Cited

U.S. PATENT DOCUMENTS

| | | | |
|---|---|---|---|
| 4,116,465 A | 9/1978 | Maclaren et al. | |
| 4,624,467 A | 11/1986 | Burns | |
| 4,746,140 A | 5/1988 | Kassai et al. | |
| 4,768,806 A | 9/1988 | Tetreault | |
| 4,811,968 A | 3/1989 | Bolden | |
| 4,834,415 A | 5/1989 | Yee | |
| 4,887,836 A | 12/1989 | Simjian | |
| 5,360,222 A * | 11/1994 | Bro | B62B 5/082 280/47.34 |
| 5,538,267 A * | 7/1996 | Pasin | A63H 33/003 280/47.35 |
| 5,833,251 A | 11/1998 | Peck | |
| 5,887,935 A | 3/1999 | Sack | |
| 5,957,482 A * | 9/1999 | Shorter | B62B 3/02 280/47.35 |
| 6,053,515 A | 4/2000 | Kelley | |
| 6,220,611 B1 | 4/2001 | Shapiro | |
| 6,641,149 B2 | 11/2003 | Chiappetta et al. | |
| 6,733,026 B1 | 5/2004 | Robberson et al. | |
| 6,845,991 B1 | 1/2005 | Ritucci et al. | |
| 6,902,184 B2 | 6/2005 | Hsu | |
| 6,932,365 B2 * | 8/2005 | Chiappetta | B62B 3/007 280/47.34 |
| 6,962,370 B2 | 11/2005 | Simpson | |
| 7,462,009 B2 * | 12/2008 | Hartmann | B62B 5/049 280/47.371 |
| 7,487,977 B2 | 2/2009 | Johnson | |
| 7,523,955 B2 | 4/2009 | Blair | |
| 7,866,686 B2 | 1/2011 | Conaway et al. | |
| 7,992,882 B2 | 8/2011 | Engelman | |
| 8,091,916 B2 | 1/2012 | Shapiro | |
| 8,191,907 B2 | 6/2012 | Watson | |
| 8,388,015 B2 | 3/2013 | Chen | |
| 8,453,771 B1 | 6/2013 | Hirschfeld | |
| 8,827,282 B2 | 9/2014 | Schlegel et al. | |
| 8,955,855 B2 | 2/2015 | Herlitz et al. | |
| 9,108,656 B1 | 8/2015 | Notan et al. | |
| 9,333,977 B2 | 5/2016 | Herlitz et al. | |
| 9,469,324 B2 | 10/2016 | Bowman et al. | |
| 10,507,857 B2 | 12/2019 | Bowman et al. | |
| 2003/0071427 A1 | 4/2003 | Simione | |
| 2004/0232639 A1 * | 11/2004 | Chiappetta | B62B 3/007 280/47.34 |
| 2006/0213735 A1 | 9/2006 | Weinstein | |
| 2007/0152478 A1 | 7/2007 | Siesholtz et al. | |
| 2007/0228697 A1 | 10/2007 | Miller et al. | |
| 2007/0284900 A1 | 12/2007 | Sze | |
| 2008/0174155 A1 | 7/2008 | Engelman | |
| 2010/0156069 A1 | 6/2010 | Chen | |
| 2011/0025005 A1 | 2/2011 | Howell | |
| 2011/0101649 A1 | 5/2011 | Harding | |
| 2011/0169235 A1 | 7/2011 | Moster | |
| 2011/0175332 A1 | 7/2011 | Jones et al. | |
| 2012/0235372 A1 | 9/2012 | Herlitz et al. | |
| 2014/0353945 A1 | 12/2014 | Young et al. | |
| 2015/0210307 A1 * | 7/2015 | Kalinin | B62B 9/20 280/47.371 |
| 2016/0023674 A1 | 1/2016 | Nolan et al. | |
| 2016/0031469 A1 | 2/2016 | Bowan | |

FOREIGN PATENT DOCUMENTS

| | | |
|---|---|---|
| EP | 1479590 A2 | 11/2004 |
| WO | 2004002802 A1 | 1/2004 |
| WO | 2015038373 A1 | 3/2015 |
| WO | 2016018713 A1 | 2/2016 |
| WO | 2018067450 A1 | 4/2018 |

OTHER PUBLICATIONS

PCT/US2014/053780, "International Search Report", dated Feb. 6, 2015, 5 pages.

PCT/US2015/041743, "International Search Report", dated Oct. 9, 2015, 9 pages.

PCT/US2014/053780, International Search Report, dated Apr. 4, 2017, 8 pages.

Schroeder, Brady, Standard Consumer Safety Performance Specification for Carriages and Strollers, Feb. 13, 2016, 23 pages.

EP17763992.9, "Supplemental European Search Report", dated Oct. 29, 2019, 8 pages.

Boorman, Z. et al., The Design and Fabrication of an Apr. 3-5, 2014 Upright Collapsible Transport System for Pushing Children, Collapsible Kid Cruiser, ASEE Zone I.

Fisher Price Kid Utility Vehicle ("Fisher Price KUV") 2006 (Applicant states to the best of its knowledge that this reference was not publically available prior to 2006).

Peg Perego Duette SQ ("Duette SQ") 2009 (Applicant states to the best of its knowledge that this reference was not publically available prior to 2009).

Radio Flyer Ultimate EZ Fold Wagon ("Radio Flyer") 2014 (Applicant states to the best of its knowledge that this reference was not publically available prior to 2014).

EROVR Transformable Dolly, Wagon, & Cart ("EROVR") 2015 (Applicant states to the best of its knowledge that this reference was not publically available prior to 2015).

Creative Outdoor Double Seat Folding Wagon ("Creative Outdoor") 2014 (Applicant states to the best of its knowledge that this reference was not publically available prior to 2014).

Bekhic Two Seat Wagon ("Bekhic") 2014 (Applicant states to the best of its knowledge that this reference was not publically available prior to 2014).

Morgan Cycle Coach Wagon ("Morgan Cycle") 2011 (Applicant states to the best of its knowledge that this reference was not publically available prior to 2011).

Step2 Neighborhood Wagon with Seats ("Step2") 2015 (Applicant states to the best of its knowledge that this reference was not publically available prior to 2015).

B.O.B. Revolution Duallie ("Revolution Duallie") 2005 (Applicant states to the best of its knowledge that this reference was not publically available prior to 2005).

Special Tomato Jogger ("Special Tomato") 2014 (Applicant states to the best of its knowledge that this reference was not publically available prior to 2014).

Jogger Baby City Select Stroller ("Jogger") 2014 (Applicant states to the best of its knowledge that this reference was not publically available prior to 2014).

TagAlong Kids Bike Trailer ("Tagalong") Feb. 2016 (Applicant states to the best of its knowledge that this reference was not publically available prior to 2016).

CLEVR 3-in-1 Double 2 Seat Bicycle Trailer ("CLEVR") 2015 (Applicant states to the best of its knowledge that this reference was not publically available prior to 2015).

Infantastic FAH17 Bicycle Trailer ("Infantastic") 2012 (Applicant states to the best of its knowledge that this reference was not publically available prior to 2012).

Litigation-Complaint for Declaratory Judgement of Invalidity filed on Jan. 27, 2020.

Litigation-Civl Coversheet filed Jan. 28, 2020.

Litigation-Veer Gear LLC's Answer to Evenflo Company Inc.'s Complaint for Declatory Jedgment of Invalidity and CounterClaim for Patent Infringement, Apr. 28, 2020.

Litigation-Evenflo Company Inc's Answer to Vear Geer LLC's Counterclaim for Patent Infringement and Counterclaim for Declaratory Judment of Invalidity, May 19, 2020.

Veer Gear LLC's Answer to Evenflo Company Inc.'s Counterclaim for Declaration Judgment of Invalidty of U.S. Pat. No. 10,597,058., Jun. 8, 2020.

Litigation-Defendant Veer Gear's Reply in Support of Opening Claim Construction Brief, dated May 27, 2021, 26 pages.

Litigation-Defendant Veer Gear LLC's Opening Claim Constructions Brief filed on Apr. 13, 2021.

Litigation-Plaintiff/Counterclaim Defendant Evenflo Company, Inc.'s S.D. Ohio Pat. R. 105.4(a) Opening Claim Construction Brief filed Apr. 13, 2021.

(56) References Cited

OTHER PUBLICATIONS

Litigation-Joint Claim, Joint Claim Construction and Prehearing Statement Pursuant to S.D. Ohio Pat. R. 105.2 (d) and accompanying Exhibits A-I, Jan. 28, 2021.
Litigation—Memorandum Opinion—Signed by Judge Thomas M. Rose on Aug. 24, 2021. (de), Entered: Aug. 24, 2021.

* cited by examiner

Section 31-31

Section 32-32

WAGON WITH COLLAPSIBLE FOOTWELL AND POSITION-LOCKING HANDLE

CROSS-REFERENCE TO RELATED APPLICATION

This application claims the priority benefit of U.S. application Ser. No. 15/453,329, filed Mar. 8, 2017, U.S. Provisional Patent Application Ser. No. 62/307,726, filed Mar. 14, 2016, and U.S. Provisional Patent Application Ser. No. 62/305,017, filed Mar. 8, 2016, which are hereby incorporated herein by reference.

TECHNICAL FIELD

The present invention relates generally to consumer-use wagons, and particularly to pull-handle wagons for multipurpose use including carrying seated children and/or household cargo.

BACKGROUND

Conventional consumer-use wagons are commonly used for holding and carrying cargo such as children, their toys, beach items (e.g., chairs, towels, and sand buckets/shovels), and sports equipment (e.g., balls, bats, and helmets). Such wagons typically include a generally rectangular base and four generally rectangular upright walls forming an opentopped container, with a pull handle pivotally coupled to the base front, and with four wheels rotationally mounted to the base bottom. A traditional and well-known wagon of this type is the classic RADIO FLYER wagon.

While these wagons have their advantages, they also have some drawbacks. Accordingly, needs exist for improved features for consumer-use wagons for multi-purpose use. It is to the provision of solutions to these and other problems that the present invention is primarily directed.

SUMMARY

Generally described, the present invention relates to consumer-use wagons for multi-purpose use including carrying seated children and/or household cargo. In some embodiments, the wagons have a footwell for children carried in the wagon to place/rest their feet, and the footwell is repositionable between an extended/use position lowered relative to the wagon base and a collapsed/storage position closer to the wagon base. And in some embodiments, the wagons have a pull-handle that can be moved between different positions and that is lockable in multiple of the different positions.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Generally described, the present invention relates to a consumer-use wagon that includes a base and a peripheral wall arrangement that together form a container, and that additionally includes a collapsible footwell, a positionlocking handle, or both. It will be understood that the specific dimensions and proportions identified herein are representative for illustration purposes only, and are not limiting of the invention; in fact the invention expressly contemplates and covers many other embodiments with different dimensions, proportions, assembly methods, and overall designs.

The collapsible footwell includes a footrest that is positionable between an extended/use position lowered relative to the base and a collapsed/storage position closer to the base to provide a compact profile/arrangement to reduce the occupied footwell volume for storage and/or transport purposes. In the collapsed/storage position, the vacated space where the footwell was in the extended/use position effectively reduces the height dimension of the wagon with the wheels displaced (e.g., removed or folded to adjacent the base) to provide a smaller size for transportation and storage, for example during shipping from the manufacturer and/or the retailer, during storage in a user's garage, and/or during transport in a user's personal vehicle. The overall height of the wagon, with the wheels displaced and the upright walls folded down, is thus significantly reduced, thereby significantly reducing its package size for shipment from the manufacturer and/or retailer, and thereby significantly reducing shipping costs.

Figure 1:
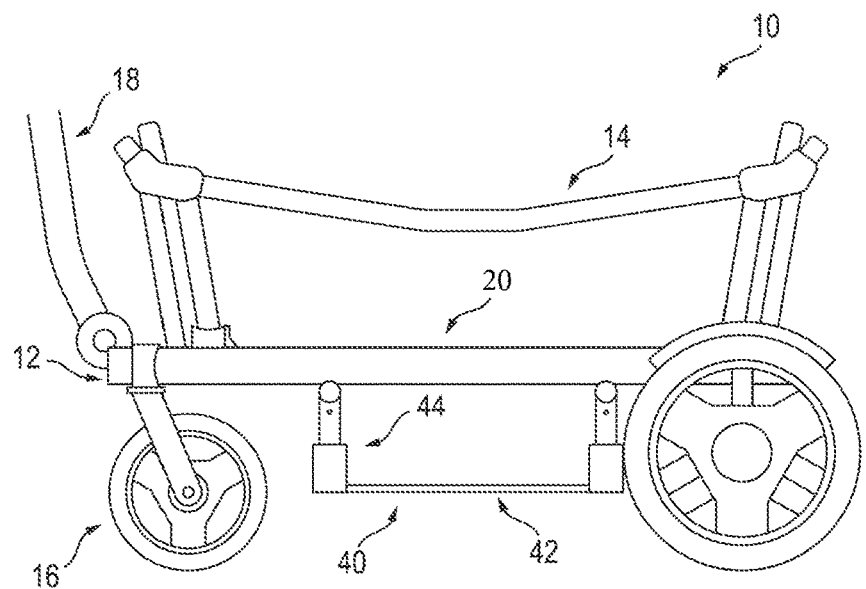
FIGS. 1-17 show a wagon with a collapsible footwell feature according to a first example embodiment of the invention.
Figure 2:
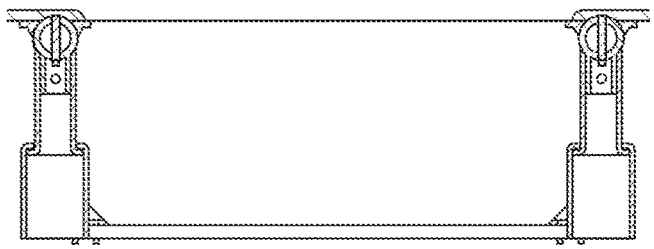
Figure 3:
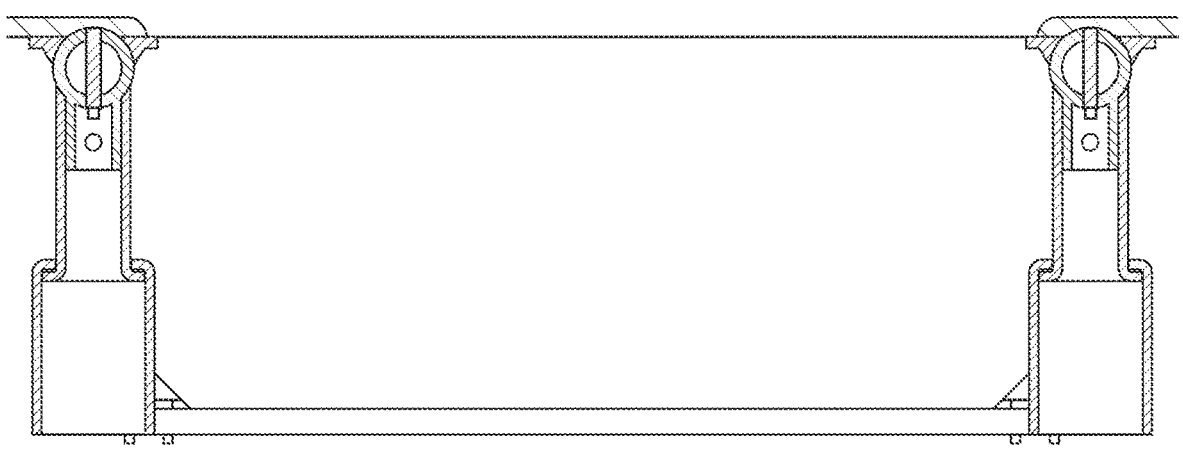
Figure 4:
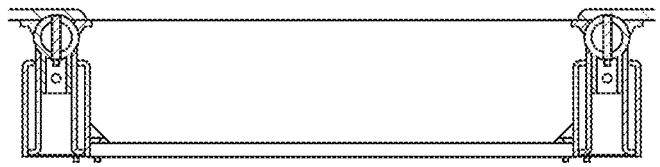
Figure 5:
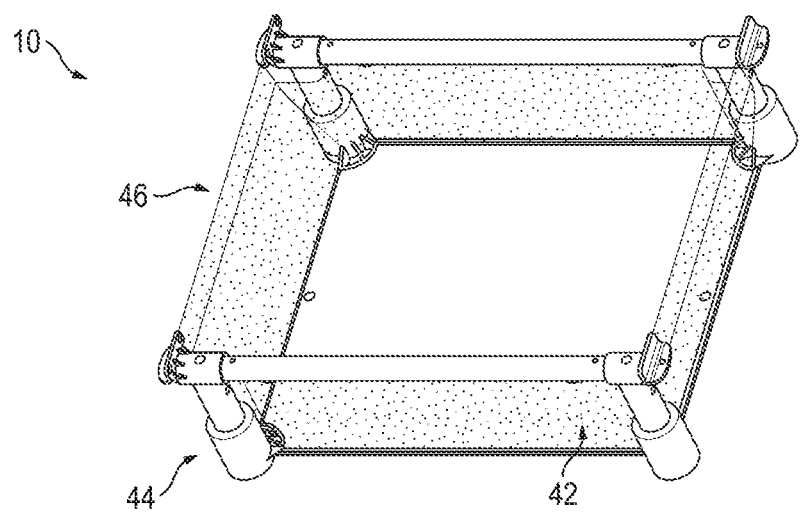
Figure 6:
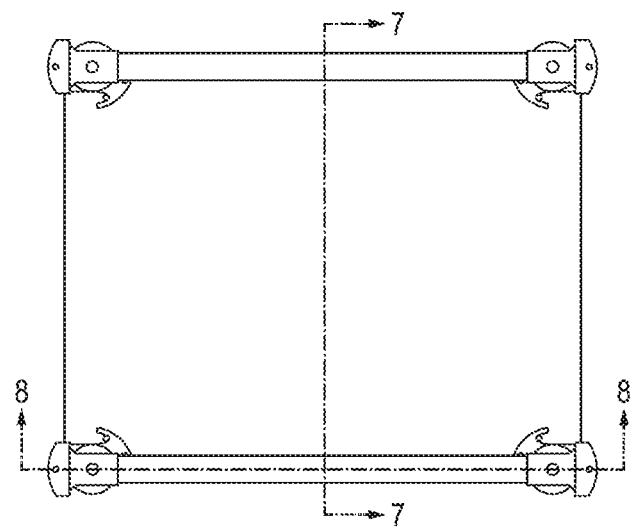
Figure 7:
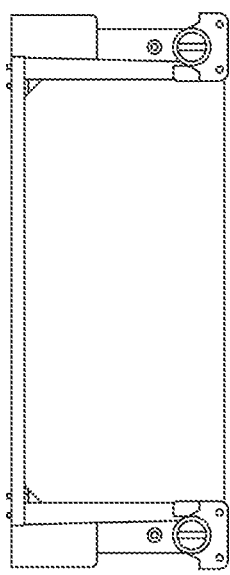
Figure 8:
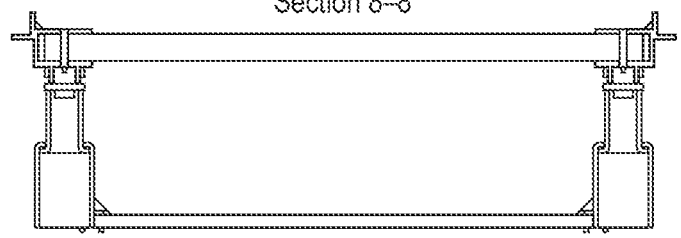
Figure 9:
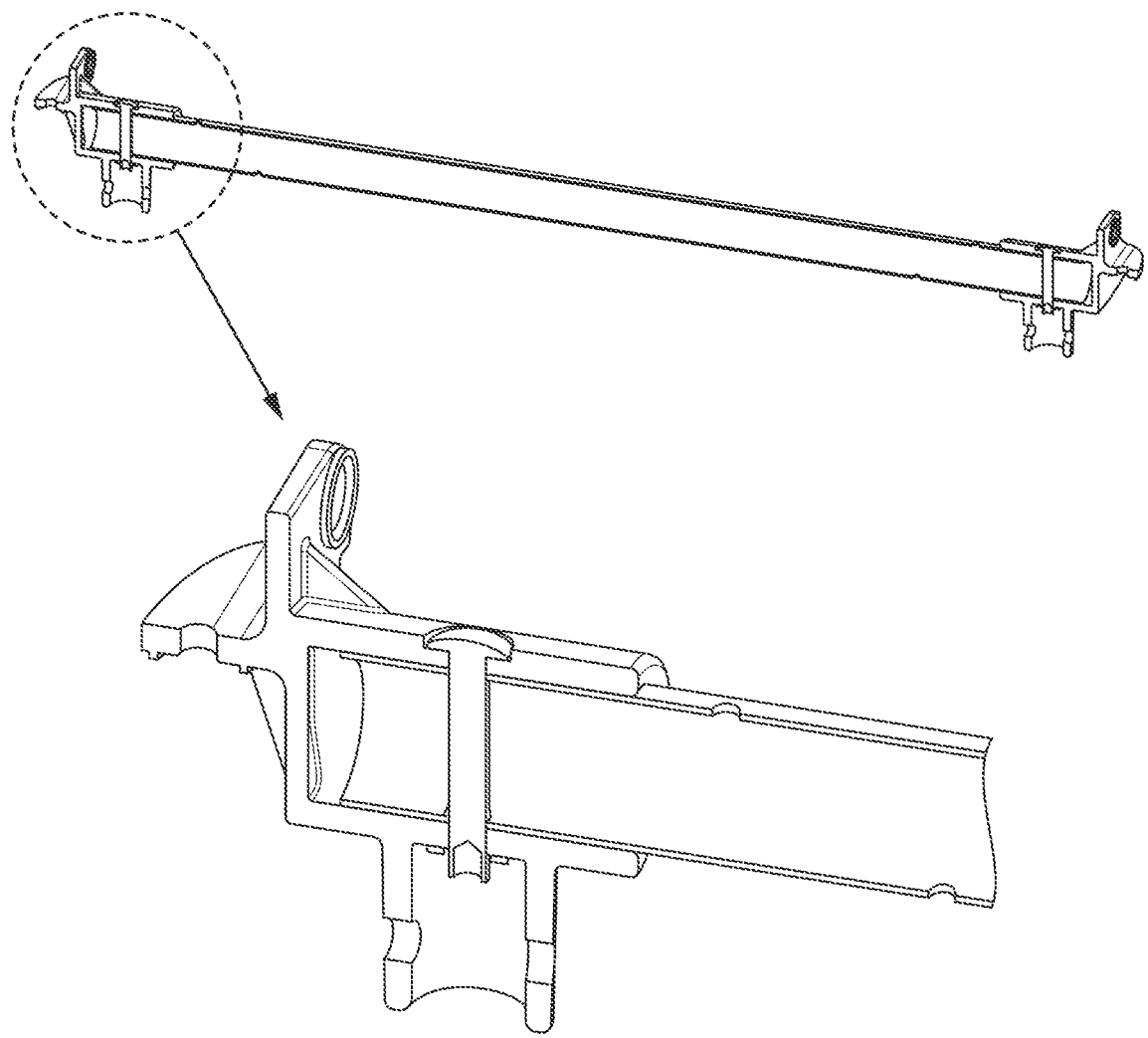
Figure 10:
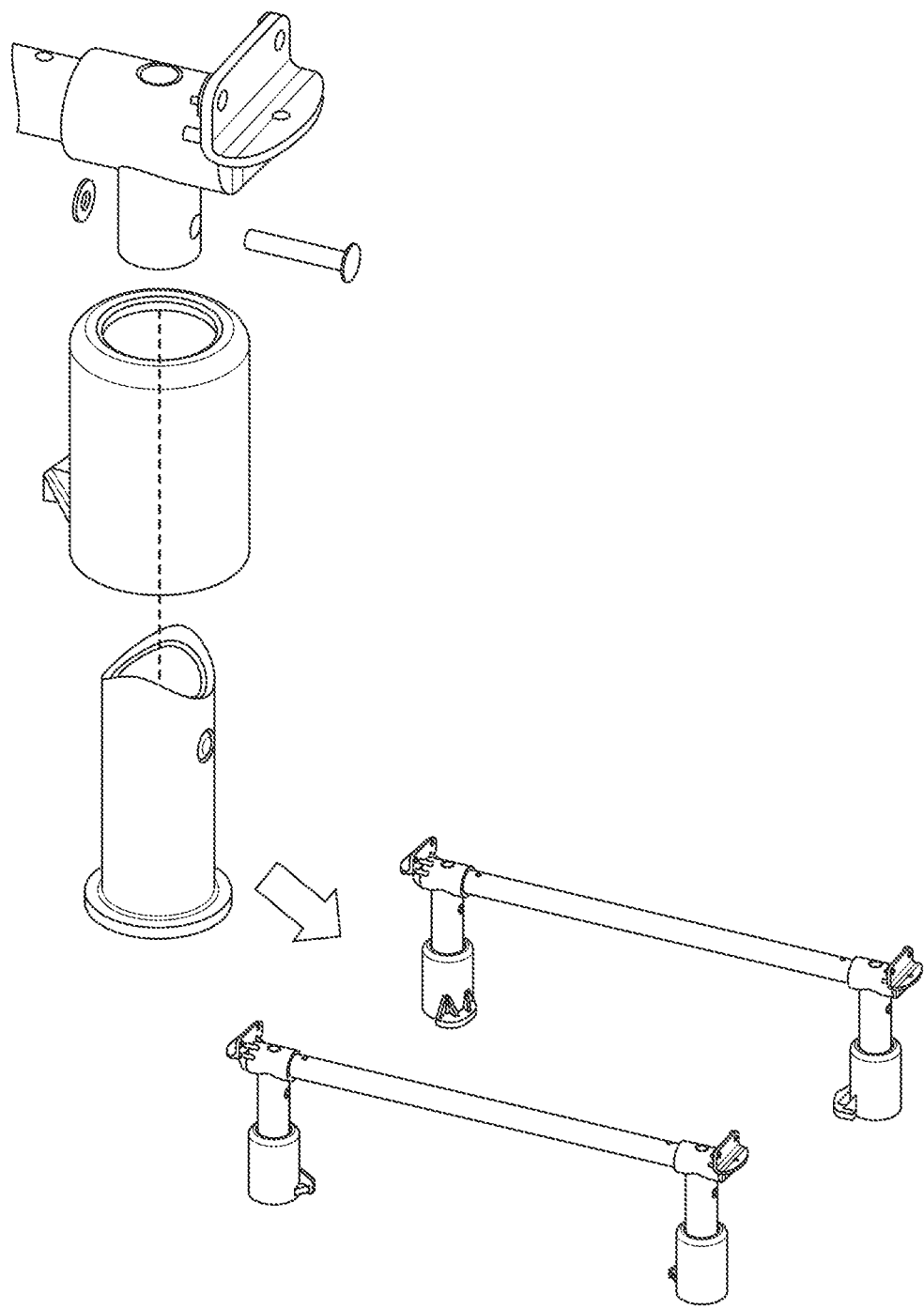
Figure 11:
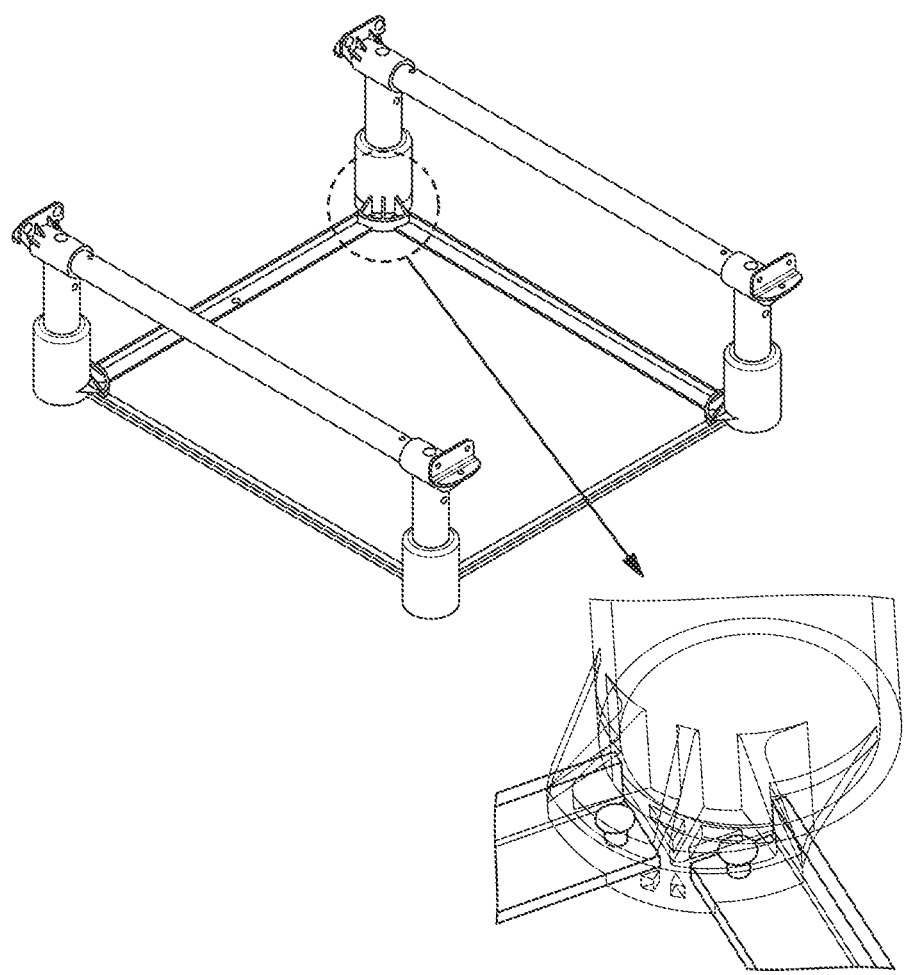
Figure 12:
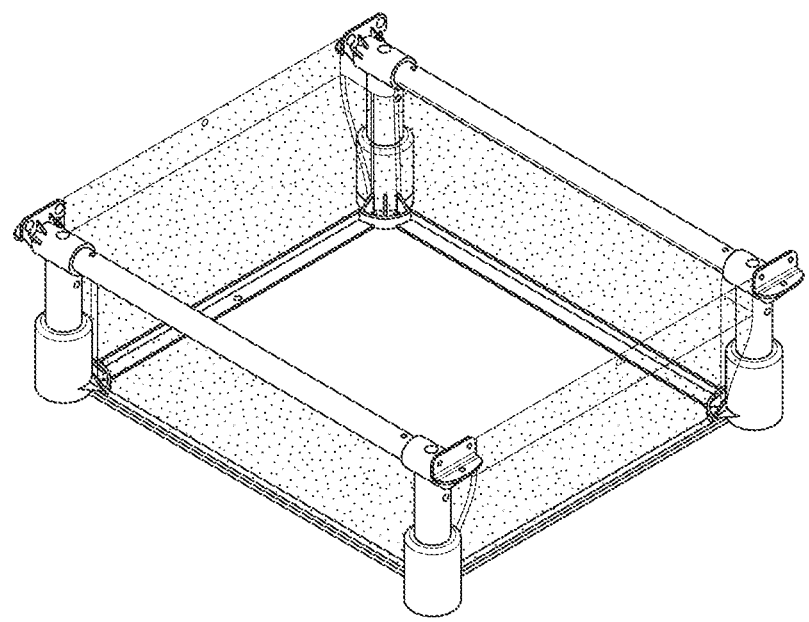
Figure 13:
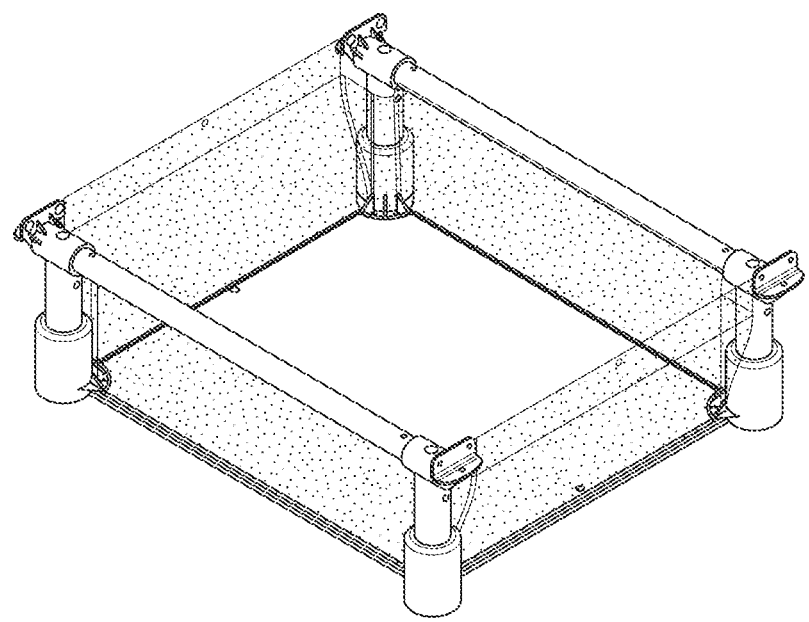
Figure 14:
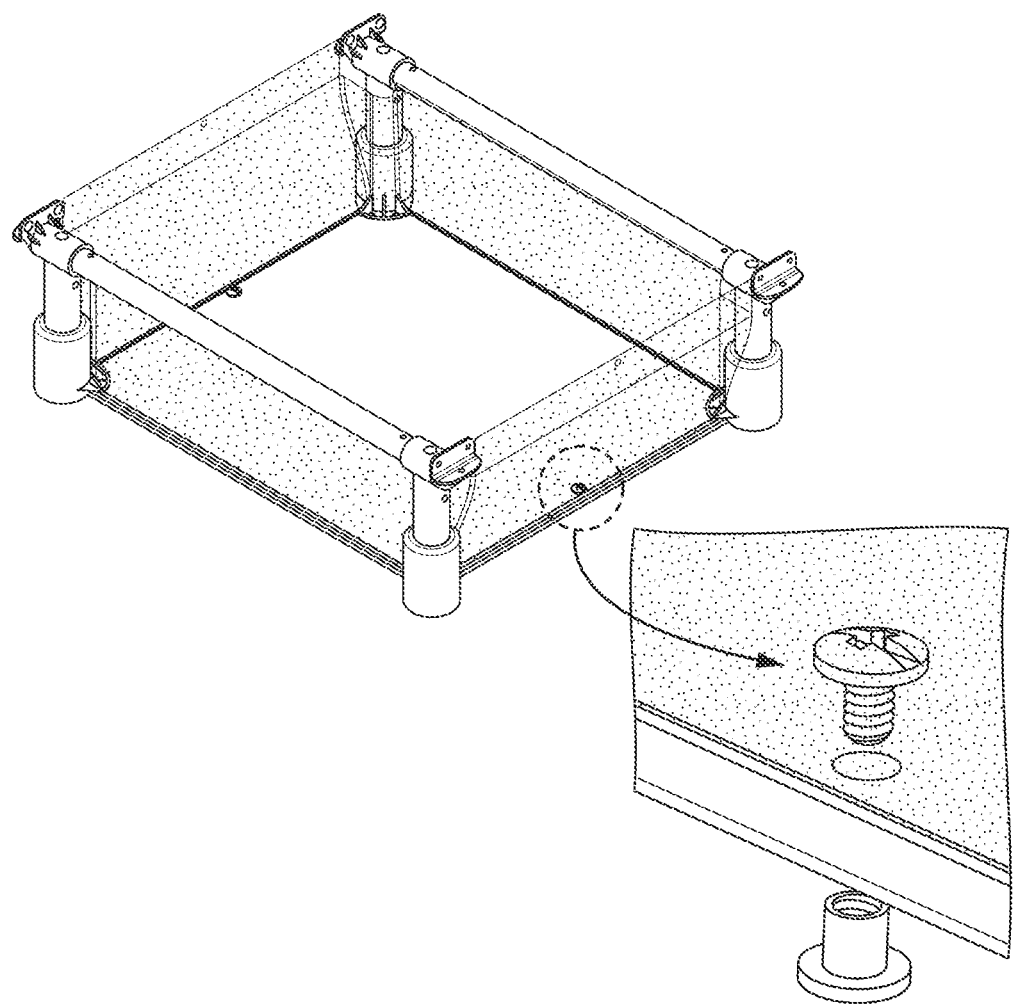
Figure 15:
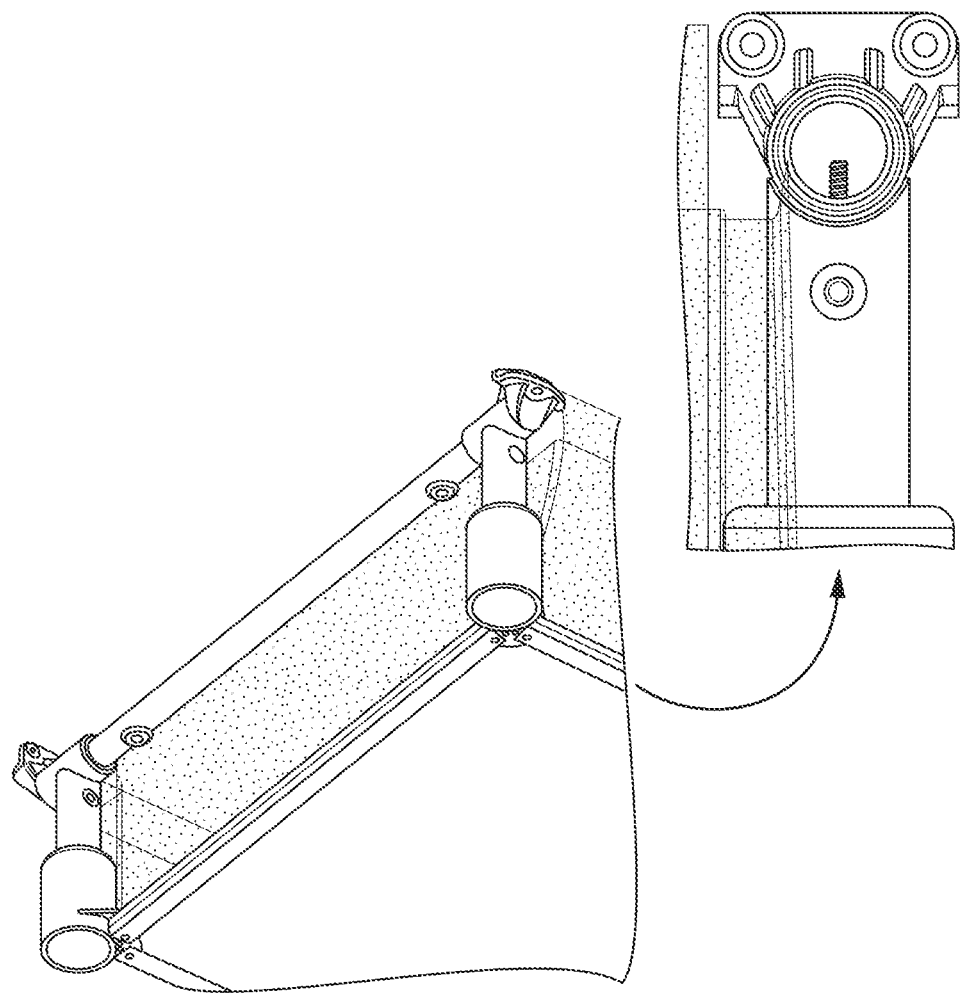
Figure 16A:
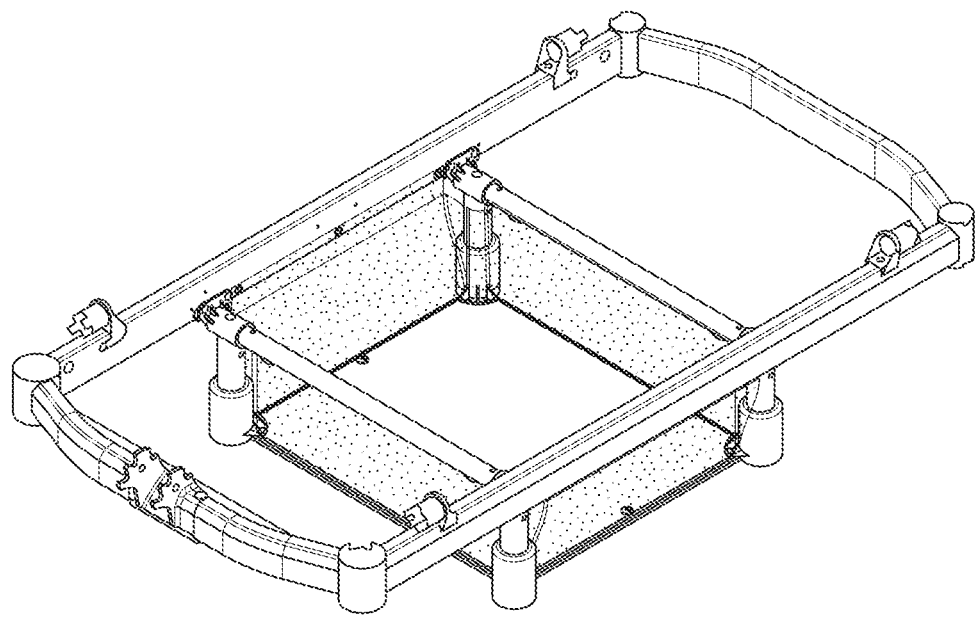
Figure 16B:
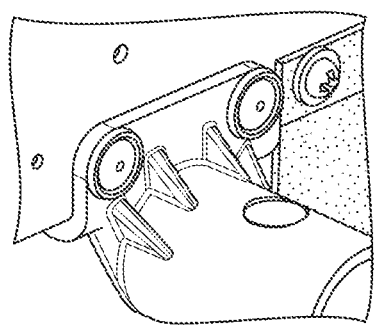
Figure 16C:
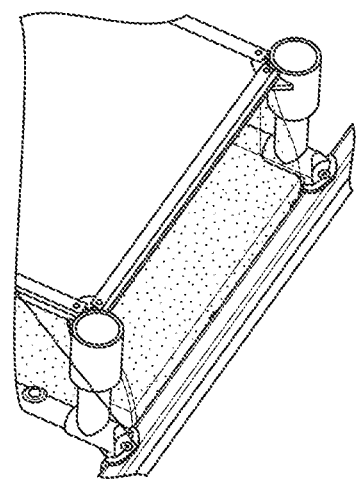
Figure 17:
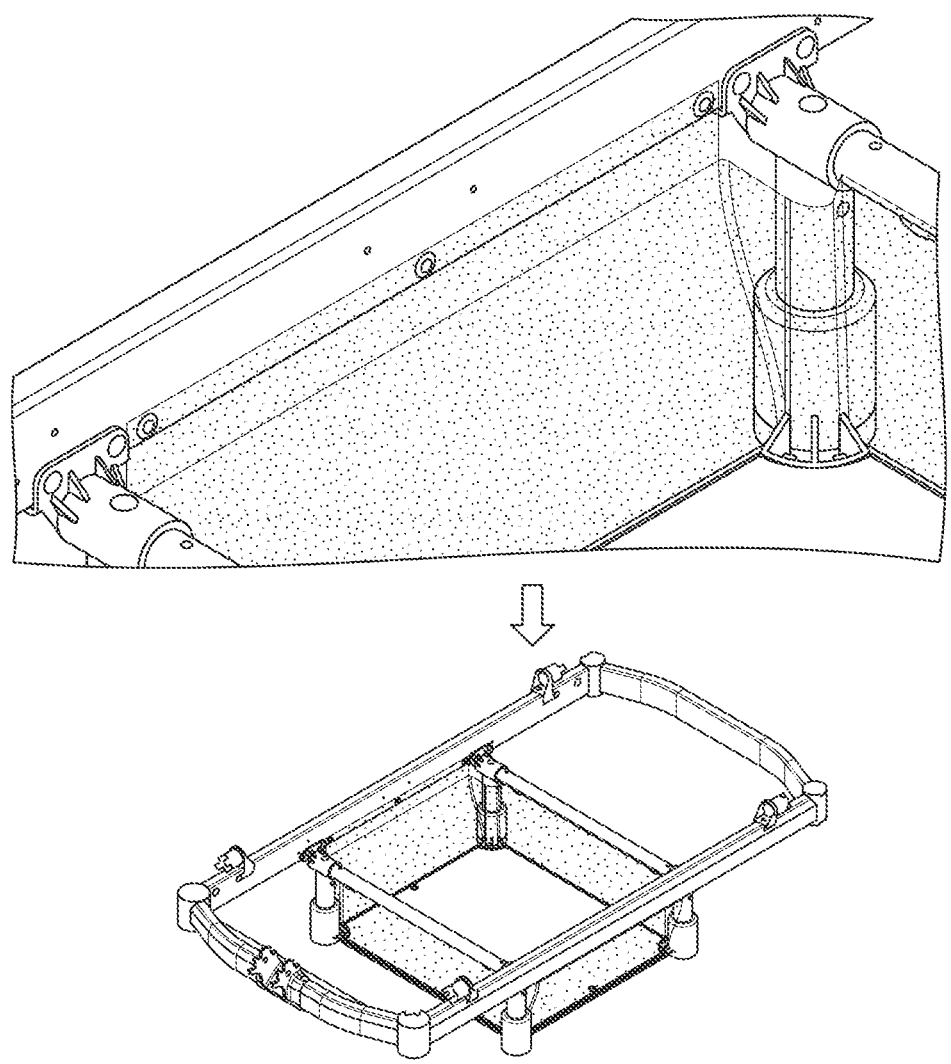

FIGS. 1-17 show a wagon 10 with a collapsible footwell feature 40 according to a first example embodiment of the invention. The wagon 10 includes a base 12, peripheral walls 14 extending upright from the base, wheels 16 supporting and pivotally mounted (directly or indirectly) to the base, and a handle 18 pivotally mounted to the base. For example, the base 12 can include a peripheral frame, and the upright walls 14 can include two opposing sidewalls and two opposing endwalls, with the sidewalls and the endwalls all pivotally mounted at lower portions thereof to the base frame for pivoting from their upright/use position (FIG. 1)

to their collapsed/stored position (not shown) folded down adjacent (i.e., against or closer to) the wagon base. The wagon 10 may include a bottom surface 20. In some aspects, the bottom surface 20 may include at least one seating surface, for example a first seating surface 22 (see FIG. 27), an additional seating surface, for example a second seating surface 24 (see FIG. 27), and a footrest 42. In some aspects, the base 12 may include the bottom surface 20. In addition, the upright walls 14 can each include a structural frame (e.g., two outer uprights and an upper connecting member extending therebetween) and soft goods (e.g., fabric sheets) attached to the structural frame to form a contained space within the wagon. The wheels 16 can be displaceable from their use position, for example by being removable from the base, foldable flat to adjacent the base, etc. All of these features of the wagon can be of a conventional type and as such are not described in great detail herein. As an example, these features of the wagon can be of the same type as those described in U.S. Pat. No. 9,108,656, which is hereby incorporated herein by reference.

The collapsible footwell feature 40 includes the footrest 42 and upright elements 44 extending between the wagon base 12 (e.g., base frame) and the footrest. The footwell 40 also includes an opening in the wagon base 12 (e.g., where there is no bottom wall mounted to the base frame), which can have the same shape (e.g., rectangular) and size as the footrest 42 and be aligned directly above the footrest (e.g, generally centrally positioned in the wagon). In this embodiment, the upright elements 44 are provided by telescoping assemblies, for example four telescoping assemblies, with one in each of the four corners of the footrest 42. Each of the telescoping assemblies includes an upper telescoping segment extending downward from the base 12 and a lower telescoping segment extending upward from the footrest 42, aligned with the upper telescoping segment, and telescopingly engaging (e.g., concentrically sliding relative to) the upper telescoping segment. In other embodiments, each telescoping assembly includes more than two concentric telescoping segments, which embodiments can provide an even lower profile/height in the collapsed/stored position. And in other embodiments, each telescoping assembly includes an opening in the base through which extends an upright element with a top that is enlarged (e.g., flanged) so that it cannot fit down through the respective base opening, which embodiments may not provide as low a profile/height in the collapsed/stored position.

The footrest 42 can be provided by a link of a 4-bar linkage, or by a plate, panel, grate, or other rigid member that can support the weight of a child in the wagon 10. A footwell peripheral sidewall 46 (e.g., FIG. 5) of a flexible sheet material (e.g. soft goods such as fabric) can be provided surrounding the footrest 42 (e.g., on all four sides and ends), extending generally vertically between the footrest and the wagon base 12, and defining the footwell interior.

In the depicted embodiment, the footrest 42 drops freely under the force of gravity to the extended/use position, and elevates freely with minimal force into the collapsed/storage position, with no mechanical component(s) to restrict such movement. In other embodiments, lock or retainer mechanisms, which can be of a conventional type known in the art such as spring-biased pushpins, are provided to releasably secure the footrest in either position.

Because of this innovative design, the footwell 40 can be easily repositioned between the extended/use position (FIGS. 1-3) and the collapsed/storage position (FIG. 4) as may be desired for use or for storage/transport as may be desired at the time. In a commercial version of the depicted embodiment, with the wheels 16 (including the vertical supports that removably mount to the base frame) removed and the upright walls 14 folded down (not shown), the overall height of the collapsed wagon 10 is reduced from about 10.25 inches (with the footwell in the extended/use position) to about 8.375 inches (with the footwell in the collapsed/storage position), for a package volume reduction of about 17 percent.

FIGS. 9-17 show an example assembly method of the collapsible footwell 40 of the wagon 10 of the first example embodiment. In addition to showing an example method of assembling this particular footwell embodiment 40, these figures depict additional structural details of the design and construction of this particular footwell embodiment.

Figure 18:
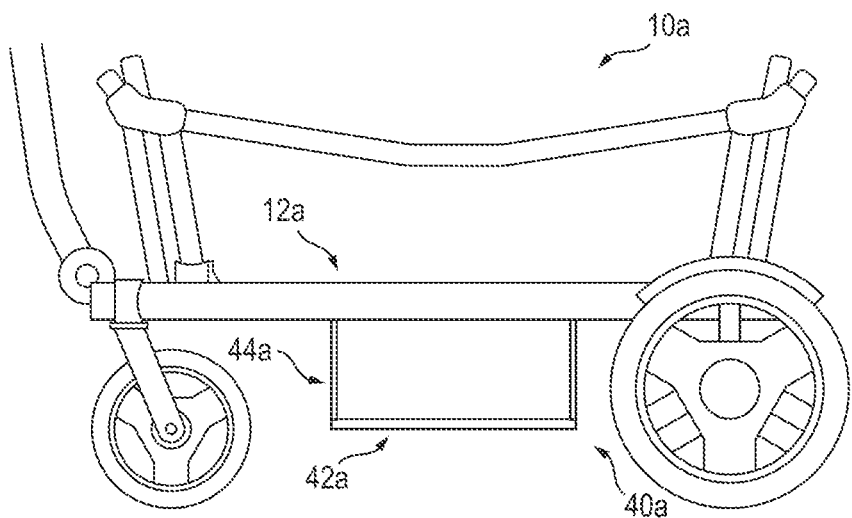
FIGS. 18-20 show a wagon with a collapsible footwell feature according to a second example embodiment of the invention.
Figure 19:
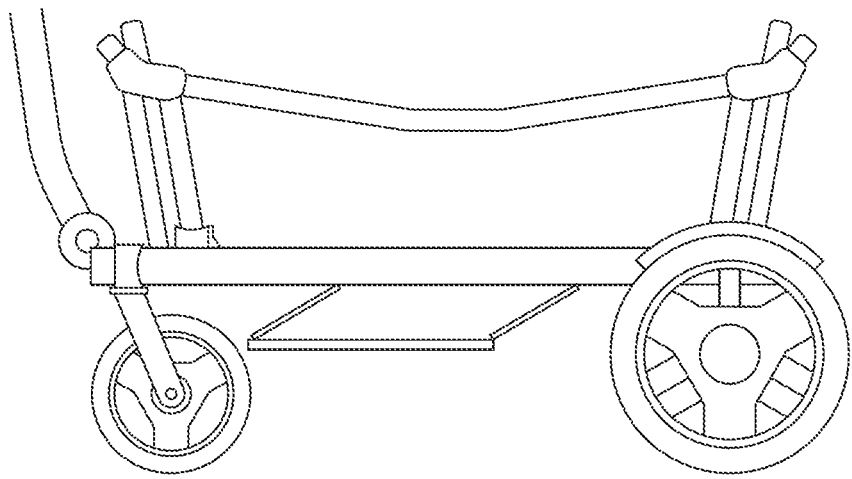
Figure 20:
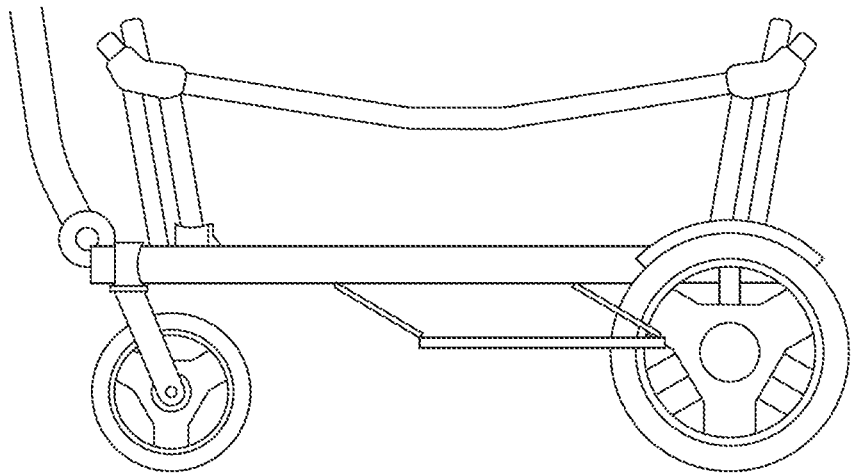

FIGS. 18-20 show a wagon 10a with a collapsible footwell feature 40a according to a second example embodiment of the invention. The collapsible footwell feature 40a of this embodiment is similar to that of the first embodiment in that it includes a footrest 42a and upright elements 44a extending between the wagon base 12a and the footrest. In this embodiment however, the upright elements are provided by at least two upright structural members, one forward and one rearward, that are each pivotally coupled at upper portions to the base and pivotally coupled at lower portions to the footrest. The pivotal couplings can be of a conventional design and assembly. The at least one forward upright structural member can be provided by two tubes, wires, rods, etc. at the two respective forward corners of the footrest, by a plate, panel, lattice, etc. extending laterally across the footrest, or by other conventional structural members, and the same applies to the at least one rearward upright structural member. In this way, the footwell can be collapsed from the extended/use position (FIG. 18) to the collapsed/storage position (FIGS. 19-20) by swinging/pivoting the footrest forward or rearward respectively. Also, a footwell peripheral sidewall (not shown) of soft goods (e.g., fabric) can be provided surrounding the footrest and defining the footwell interior.

Figure 21:
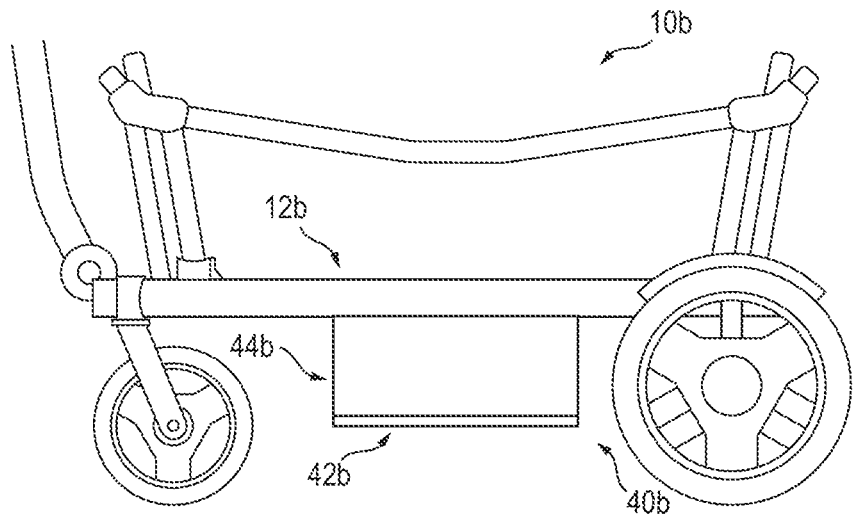
FIGS. 21-22 show a wagon with a collapsible footwell feature according to a third example embodiment of the invention.
Figure 22:
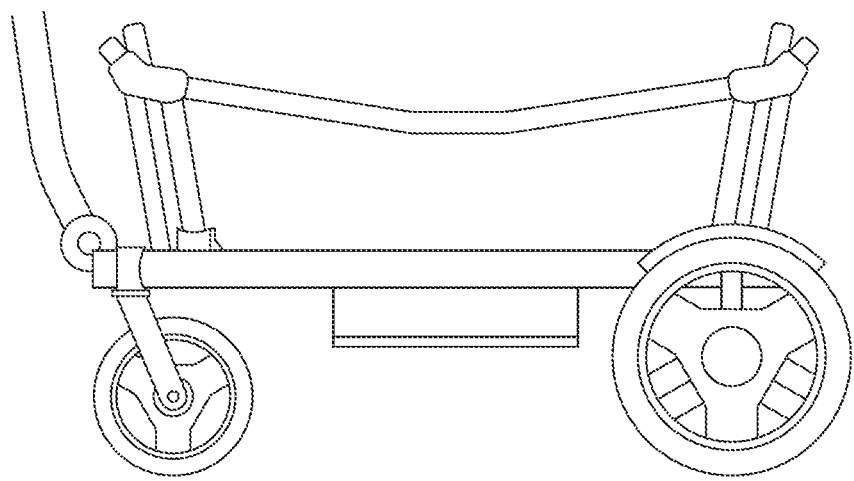

FIGS. 21-22 show a wagon 10b with a collapsible footwell feature 40b according to a third example embodiment of the invention. The collapsible footwell feature 40b of this embodiment is similar to that of the first embodiment in that it includes a footrest 42b and upright elements 44b extending between the wagon base 12b (e.g., a base frame) and the footrest. In this embodiment, however, the upright elements are provided by a sheet of flexible material (e.g., soft goods such as fabric), for example forming a peripheral wall surrounding the footrest and defining the footwell. The fabric peripheral wall is not rigid or structural in the vertical dimension, though it can have peripheral reinforcing elements (e.g., ala an accordion) for holding it shape. The maximum depth of the footwell is thus limited by the installed height of the fabric, so that the fabric limits the maximum depth of the footwell in the extended/use position (FIG. 21) and permits compression of the footwell to the collapsed/storage position (FIG. 22). Depending on the flexible sheet material selected, the footrest in the collapsed/storage position can be elevated/compressed closer to the wagon base frame than is shown in FIG. 22, or even received within and flush with the wagon base.

Figure 23:
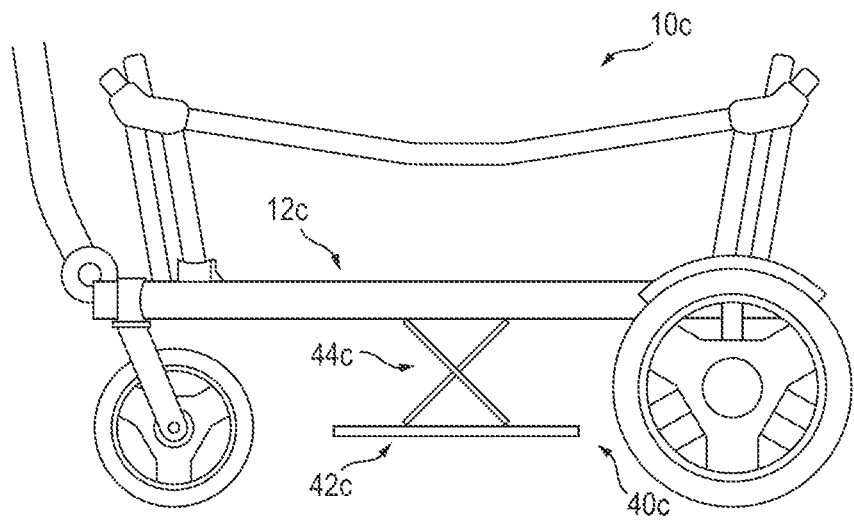
FIGS. 23-24 show a wagon with a collapsible footwell feature according to a fourth example embodiment of the invention.
Figure 24:
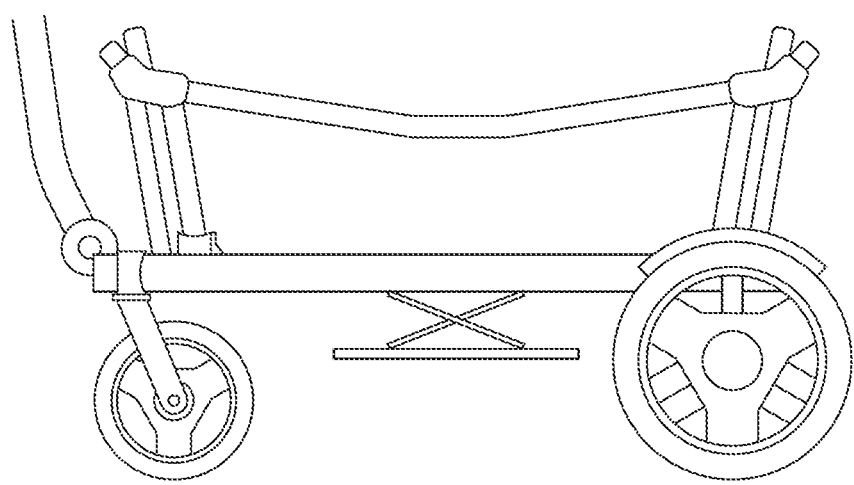

FIGS. 23-24 show a wagon 10c with a collapsible footwell feature 40c according to a fourth example embodiment of the invention. The collapsible footwell feature 40c of this embodiment is similar to that of the first embodiment in that it includes a footrest 42c and upright elements 44c extending between the wagon base 12c (e.g., a base frame) and the footrest. In this embodiment, however, the upright elements are provided by side linkages, for example the depicted X-braces that are each pivotally mounted at upper portions thereof to the wagon base, pivotally mounted at lower portions thereof to the footrest, and pivotally mounted at intermediate portions thereof to each other. The X-braces can be provided by tubes, rods, etc., and the pivotal couplings can be of a conventional design and assembly. In this way, the footwell can be collapsed from the extended/use position (FIG. 23) to the collapsed/storage position (FIG. 24). Also, a footwell peripheral sidewall (not shown) of soft goods (e.g., fabric) can be provided surrounding the footrest and defining the footwell interior.

Figure 25:
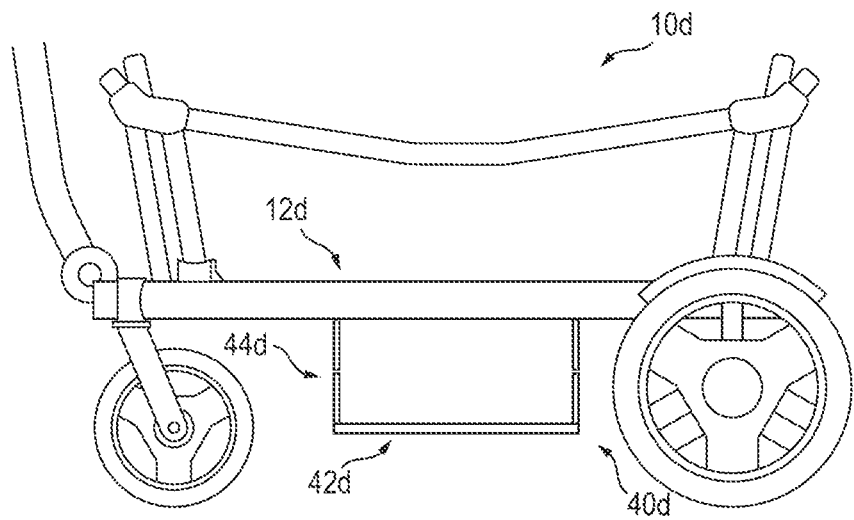
FIGS. 25-26 show a wagon with a collapsible footwell feature according to a fifth example embodiment of the invention.
Figure 26:
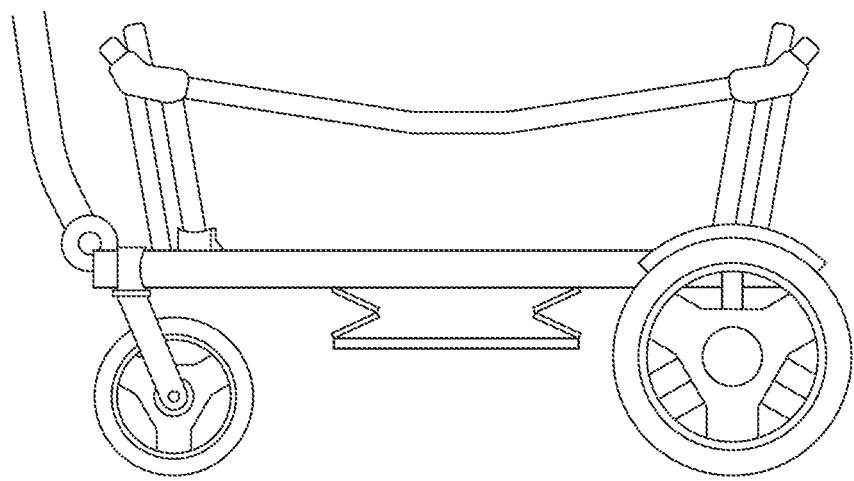

FIGS. 25-26 show a wagon 10*d* with a collapsible footwell feature 40*d* according to a fifth example embodiment of the invention. The collapsible footwell feature 40*d* of this embodiment is similar to that of the first embodiment in that it includes a footrest 42*d* and upright elements 44*d* extending between the wagon base 12*d* (e.g., a base frame) and the footrest. In this embodiment, however, the upright elements are provided by end linkages, for example the depicted forward and rearward end linkages. Each of the linkages includes at least two link segments pivotally coupled together. In the depicted embodiment, each end linkage includes two link segments pivotally coupled together with the upper link segment pivotally coupled at its top to the wagon base and with the lower link segment pivotally coupled at its bottom to the footrest, though in other embodiments more than two link segments can be provided in each in the linkage. The link segments can be provided by tubes, bars, rods, panels, etc., and the pivotal couplings can be of a conventional type. The at least one forward linkage can be provided by two forward linkages at the respective two forward corners of the footrest, by a plate, panel, lattice, etc. extending laterally across the footrest, or by other conventional structural linkages, and the same applies to the at least one rearward linkage. In this way, the footwell can be collapsed from the extended/use position (FIG. 25) to the collapsed/storage position (FIG. 26). Also, a footwell peripheral sidewall (not shown) of soft goods (e.g., fabric) can be provided surrounding the footrest and defining the footwell interior.

In other embodiments not depicted herein but contemplated by the invention, other conventional linkage systems can be implemented extending between and interconnecting the wagon base and the footrest to permit the footrest to compress, fold, slide, screw, or otherwise collapse from its extended/use position to its/storage position closer to the wagon base.

Turning now to the position-locking handle feature, on a typical wagon the handle is free to rotate about its axis until its movement is limited by the wagon geometry or the ground. But on the wagon of the present invention, the handle locks in one or more positions. Locking handle design options include automatic lock or only when intentioned by the user.

FIGS. 27-42 show the wagon 10 with a position-locking handle feature 70 according to a sixth example embodiment of the invention. The wagon 10 can be of the same type as that described above or it can be a different style of wagon. As such, the wagon 10 includes a base 12, peripheral walls 14, wheels 16, a handle 18, and a bottom surface 20. The bottom surface 20 may include a first seating surface 22, a second seating surface 24, and a footrest. In some aspects, the base 12 may include the bottom surface 20. Further details of the design and construction are not described herein for brevity.

The position-lockable handle 70 includes a handle 18, a pivot-lock mechanism 72, and a lock-release mechanism 74. The pivot-lock mechanism 72 pivotally attaches the handle 18 at a lower portion thereof to the wagon (e.g., at the front of the base) 12 to permit the handle to travel through a pivotal path in a vertical plane, and releasably locks the handle in multiple discrete predefined positions of its pivotal path. The lock-release mechanism 74 can be manually actuated to engage and reposition the pivot-lock mechanism 72 from its locked position to its released position to release the handle to travel through its pivotal path.

Figure 27:
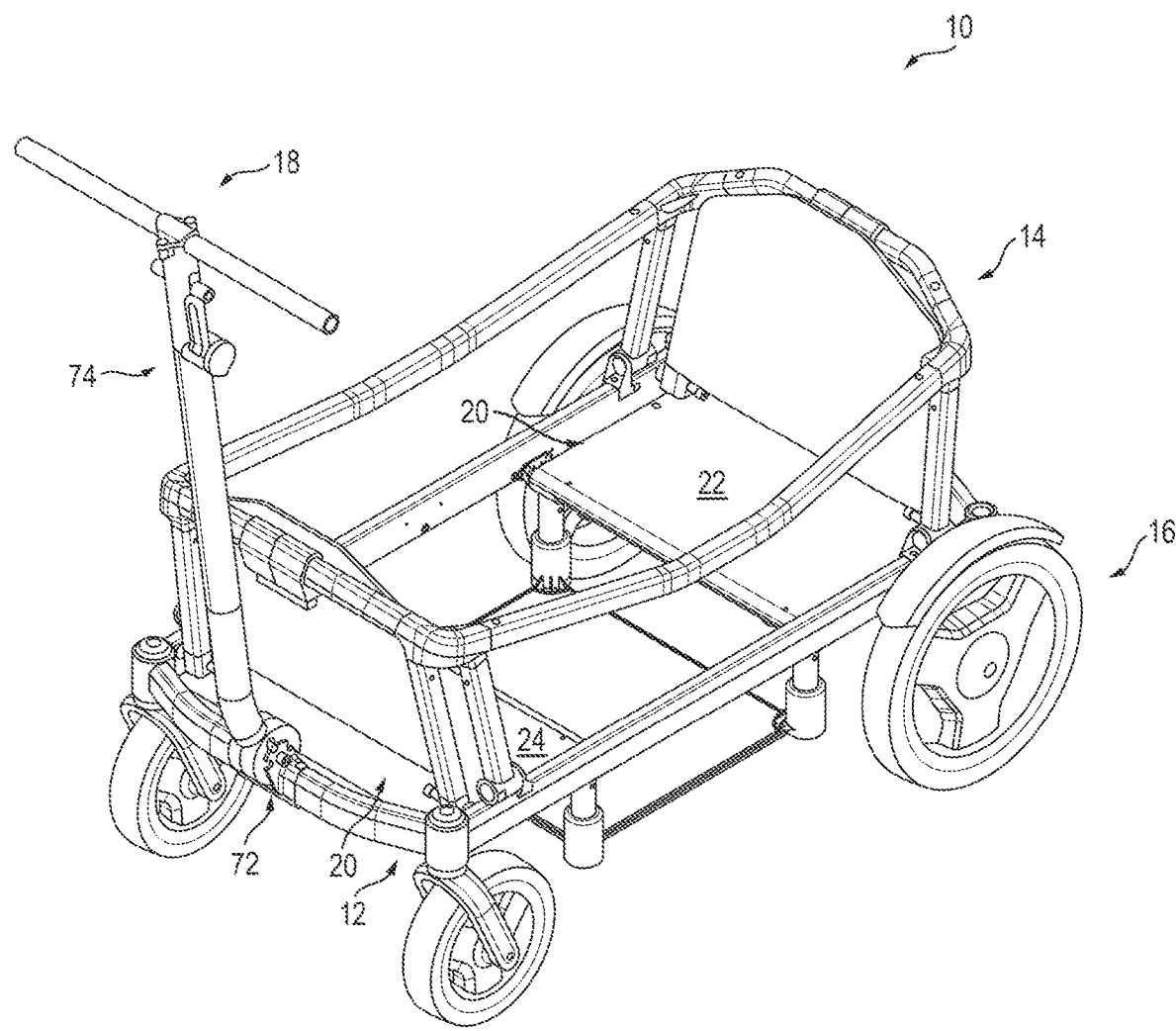
FIGS. 27-42 show a wagon with a position-locking handle feature according to a sixth example embodiment of the invention.
Figure 28:
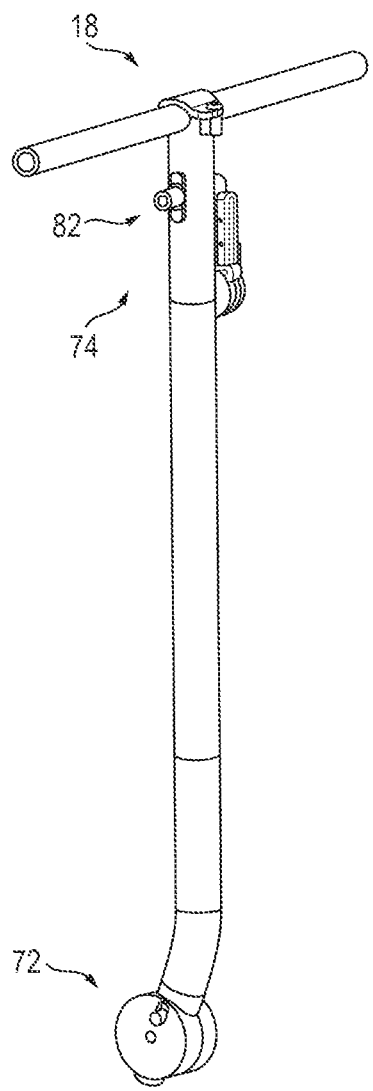
Figure 29:
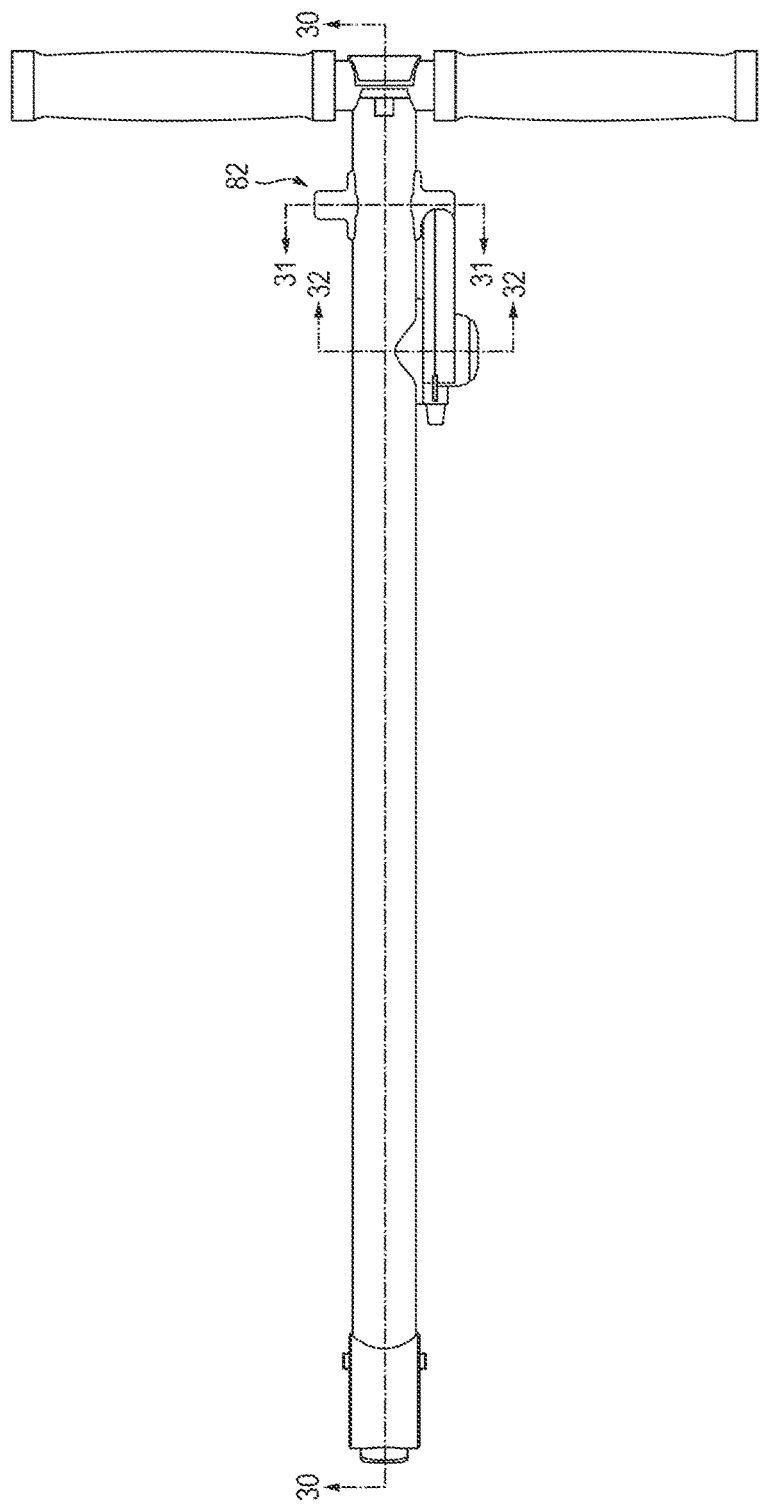
Figure 30:
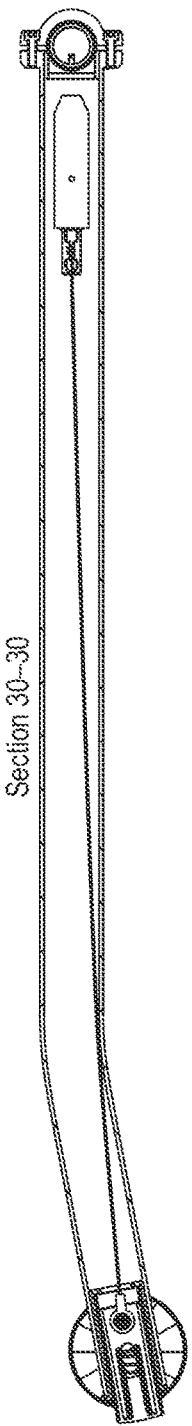
Figure 31:
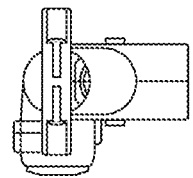
Figure 32:
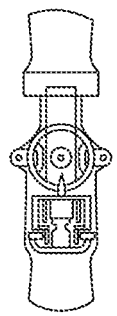
Figure 33:
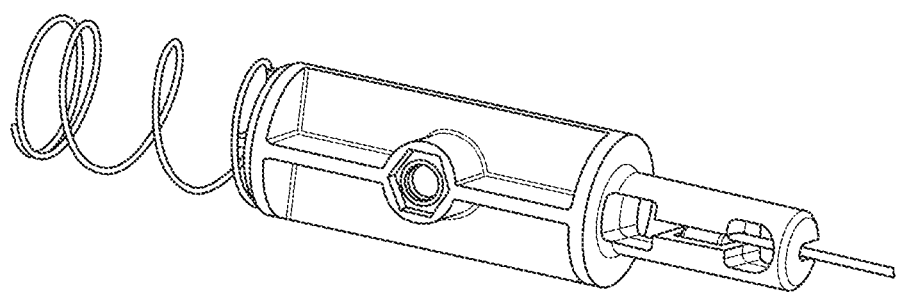
Figure 34A:
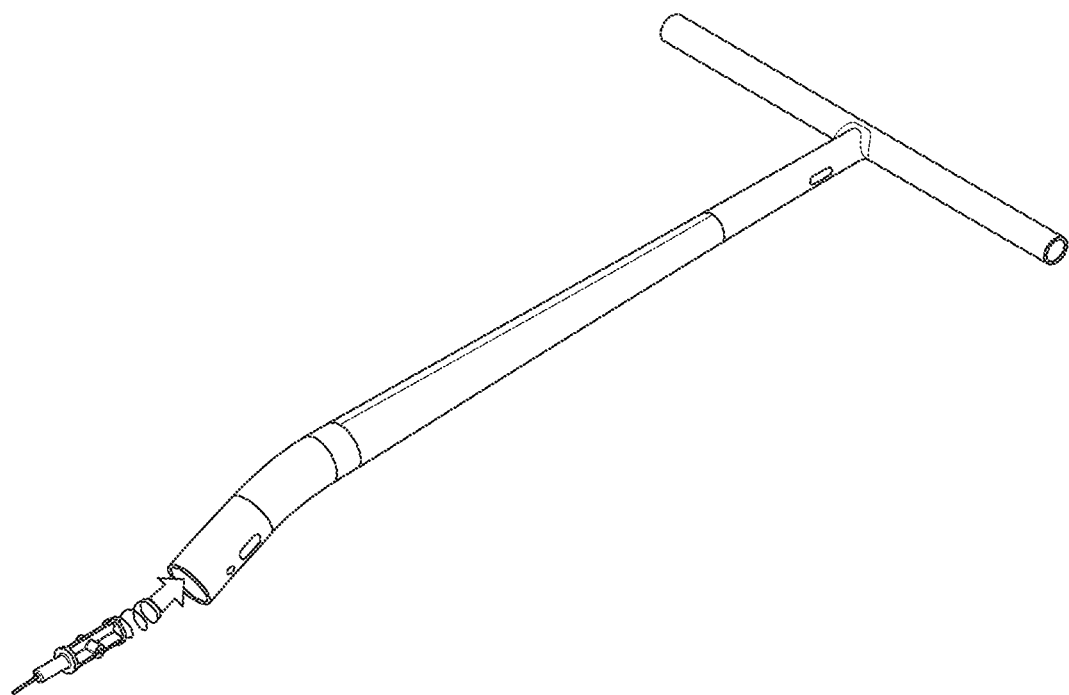
Figure 34B:
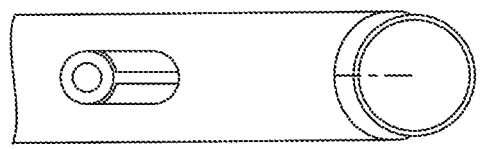
Figure 35:
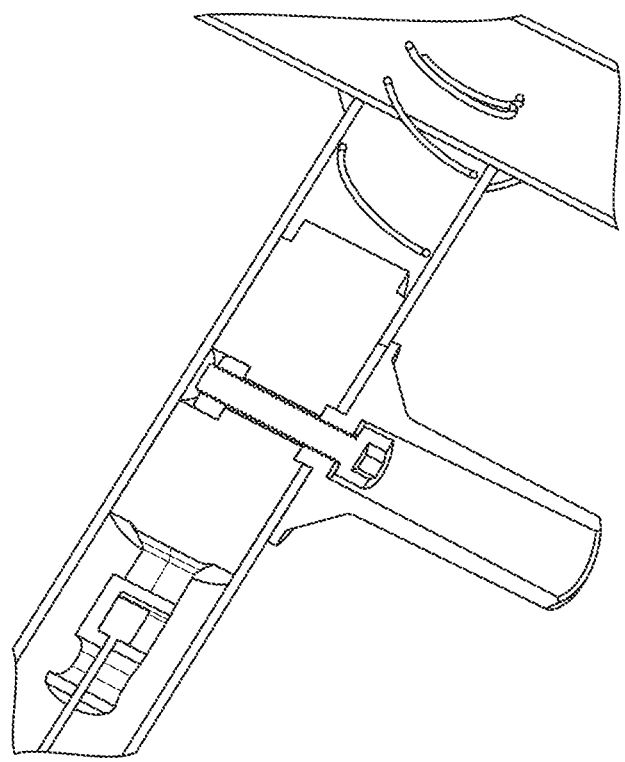
Figure 36:
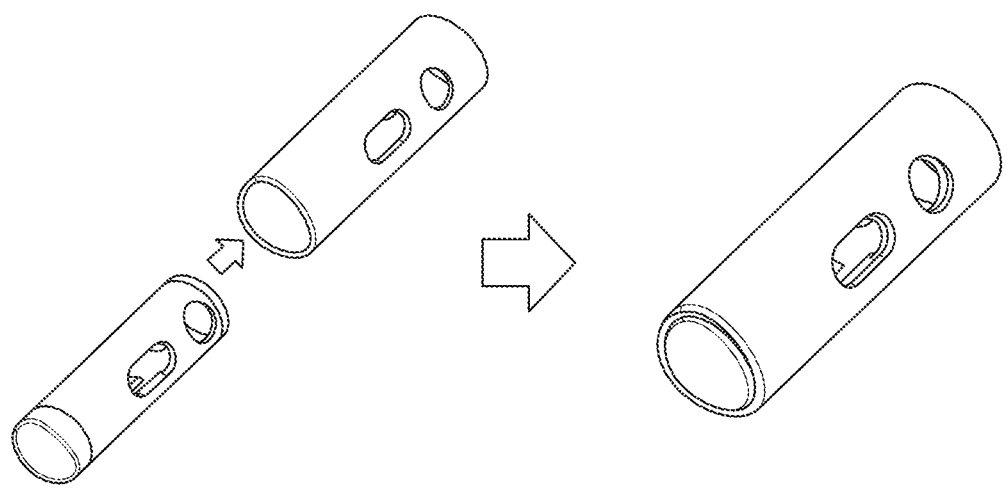
Figure 37:
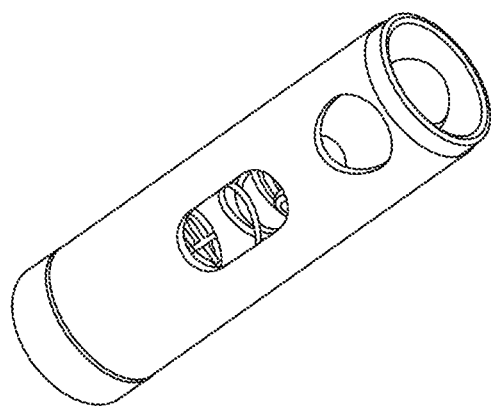
Figure 38:
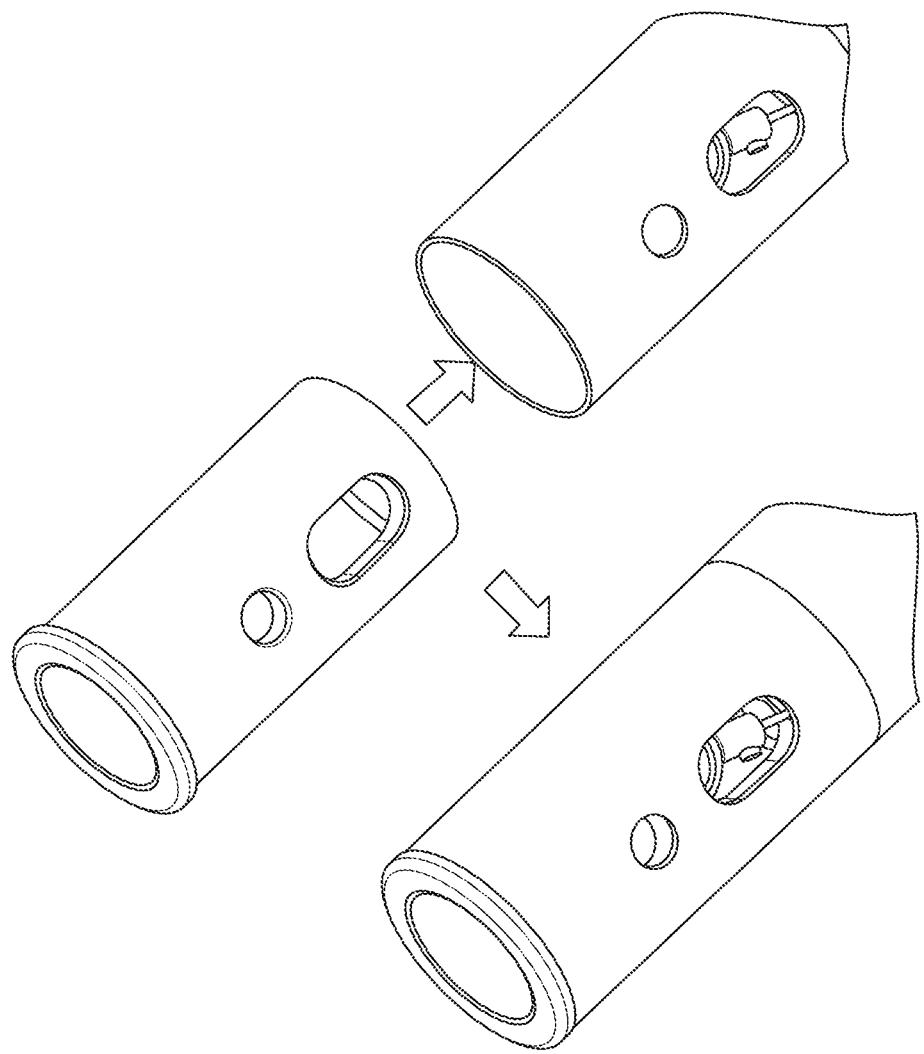
Figure 39:
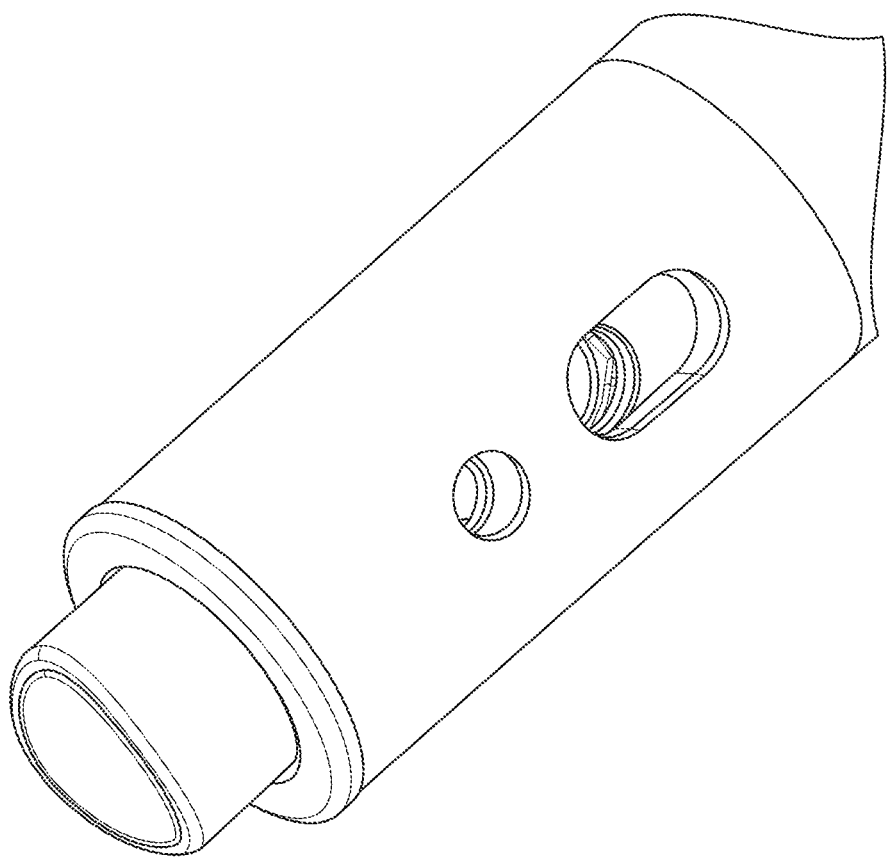
Figures 40A, 40B:
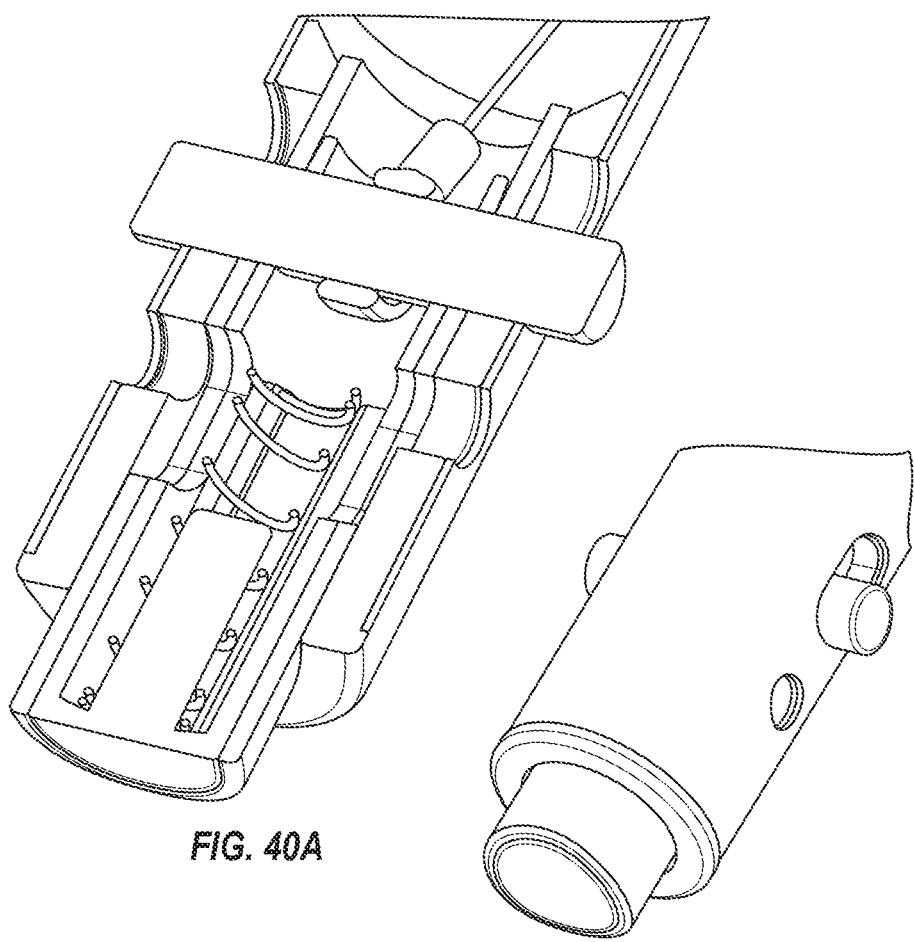
Figure 41A:
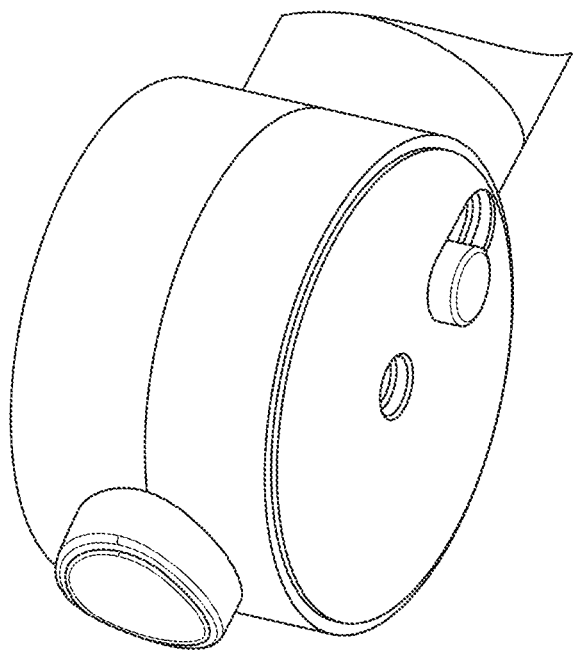
Figure 41B:
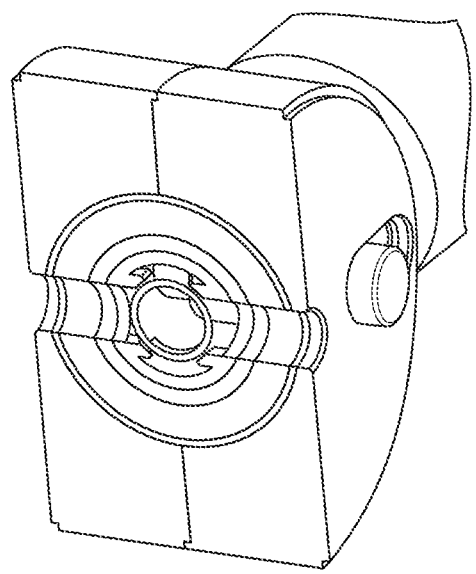
Figure 42:
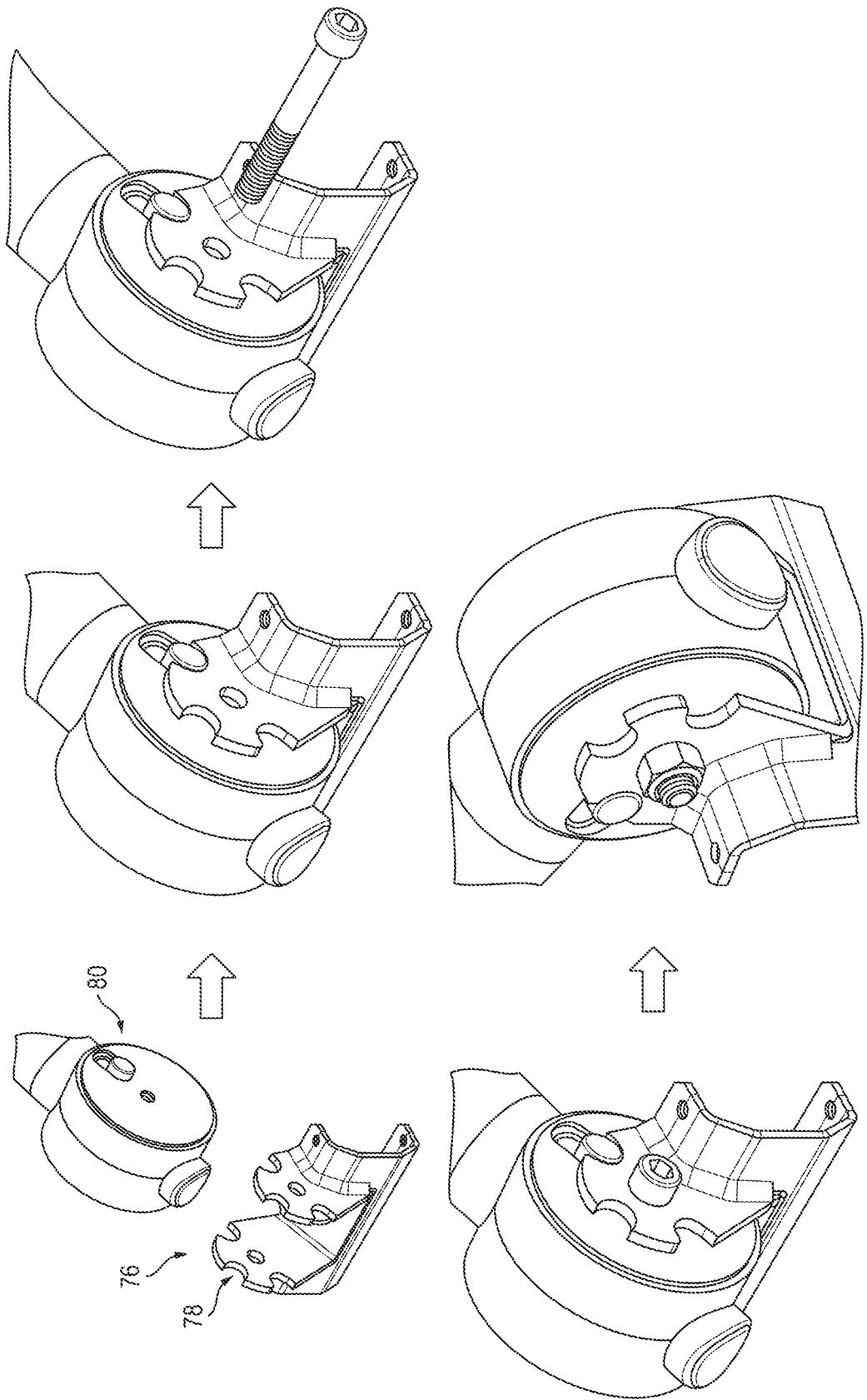

In the depicted embodiment, the pivot-lock mechanism 72 locks the handle in a "stowed" position folded backward/down onto the base in a compact arrangement for storage and/or transport (not shown), a "down" position folded forward/down but away from the base in an extended arrangement for pulling the wagon 10 (not shown), and an "upright" position between the stowed and down positions (FIG. 27). In other embodiments, the pivot-lock mechanism locks the handle in more, fewer, and or other positions. In some embodiments, the pivot-lock mechanism includes a manual lock that is operable to manually engage interlocking parts of the pivot-lock mechanism to permit the handle to be selectively locked the multiple positions only when manually actuated, and in some embodiments the lock-release mechanism includes an automatic release that is operable to automatically disengage the pivot-lock mechanism.

In typical embodiments of the pivot-lock mechanism 72 (see FIGS. 27 and 42), it includes a position-defining member 76 mounted to the wagon, for example the depicted two semicircular mounting brackets 76 that are mounted to the wagon base front in a spaced apart relationship, that have the handle 18 pivotally mounted to and between them, that each define multiple serial lock notches 78, and that are arranged so that corresponding lock notches on each bracket are in lateral alignment. In addition, the pivot-lock mechanism 72 includes at least one lock protrusion 80 that is movably mounted to the handle 18 and that releasably engages the position-defining member 76, for example the depicted two pins extending outwardly from opposite sides of the handle and receivable in sequential pairs of the lock notches 78. The rearmost notches 78 define the stowed position, the forward most notches define the down position, and the intermediate notches define the upright position. The lock protrusions 80 are spring-biased into their locking position in which they can engage one set of the aligned notches 78, and can be withdrawn from notch engagement against the spring force into their release position. In the depicted embodiment, the lock protrusions 80 move generally radially relative to the positioning bracket 76 between the locking and release positions, though in other embodiments they can move axially into and out of the notches.

And the lock-release mechanism 74 of the depicted embodiment (see FIGS. 27-31) includes a release actuator 82 that is operably coupled (e.g., by a cable) to the locking protrusion 80 (e.g., to an internal body from which the actual protrusion extends outwardly from). The release actuator 82 moves between a locked position and a release position, and is biased toward the locked position by its connection to the spring-biased locking protrusion 80. In this way, moving the release actuator 82 from its locked position to its released position causes the lock protrusion 82 correspondingly move from its locked position to its released position so that it is disengaged from the notches 78 and thus the handle 18 is free to pivot through its travel path. In other embodiments, the release actuator moves axially, rotationally, helically, or in another manner to disengage the locking protrusion. And in other embodiments, the lock-release mechanism disengages the pivot-lock mechanism by another type of actuator (e.g., a foot pedal), by a certain movement of the handle (e.g., lateral), or by another structure.

In this way, the handle 18 locks into a position automatically (under the spring influence) when the handle is placed into one of the preset locking positions. The upright position places the handle in an easily accessible position, the stowed position locks the handle in a folded position (folded over the wagon side walls) locking the wagon side walls in a folded condition, and in the down position the handle range of motion is limited to prevent the handle from contacting the ground.

Advantages of this innovation include that locking the handle 18 in the upright position eliminates the possibility of the handle resting against a seat back of the wagon 10. Thus, if the user pushes against the handle 18 (towards the body of the wagon 10) when the handle is in the upright position, the load will not be transferred into the seat back. This is particularly important if the seat back folds. Also, locking the handle 18 in the upright position places the handle in an ideal position for pushing the wagon 10.

In addition, locking the handle 18 in the down position prevents it from contacting the ground, places the handle in a more easily accessible location (reduces and/or eliminates the need to bend over to grab the handle), and prevents the handle from being damaged from rubbing rough surfaces (e.g. the ground).

Furthermore, in the stowed position the handle 18 is folded down over the folded wagon peripheral walls and can be locked in place thereby acting as a storage latch to prevent unintentional unfolding of the wagon peripheral walls.

In other embodiments, the handle does not lock automatically. Instead, the user must manually lock the handle into a fixed position. And in other embodiments, the pivot lock mechanism provides no discrete lock positions (e.g. no lock notches), so the user can manually position and secure the handle and any desired position in the pivotal travel path of the handle.

FIGS. 33-42 show an example assembly method of the position-lockable handle 70 of the wagon 10 of the sixth example embodiment. In addition to showing an example method of assembling this particular handle embodiment 70, these figures depict additional structural details of the design and construction of this particular handle embodiment.

Figure 43:
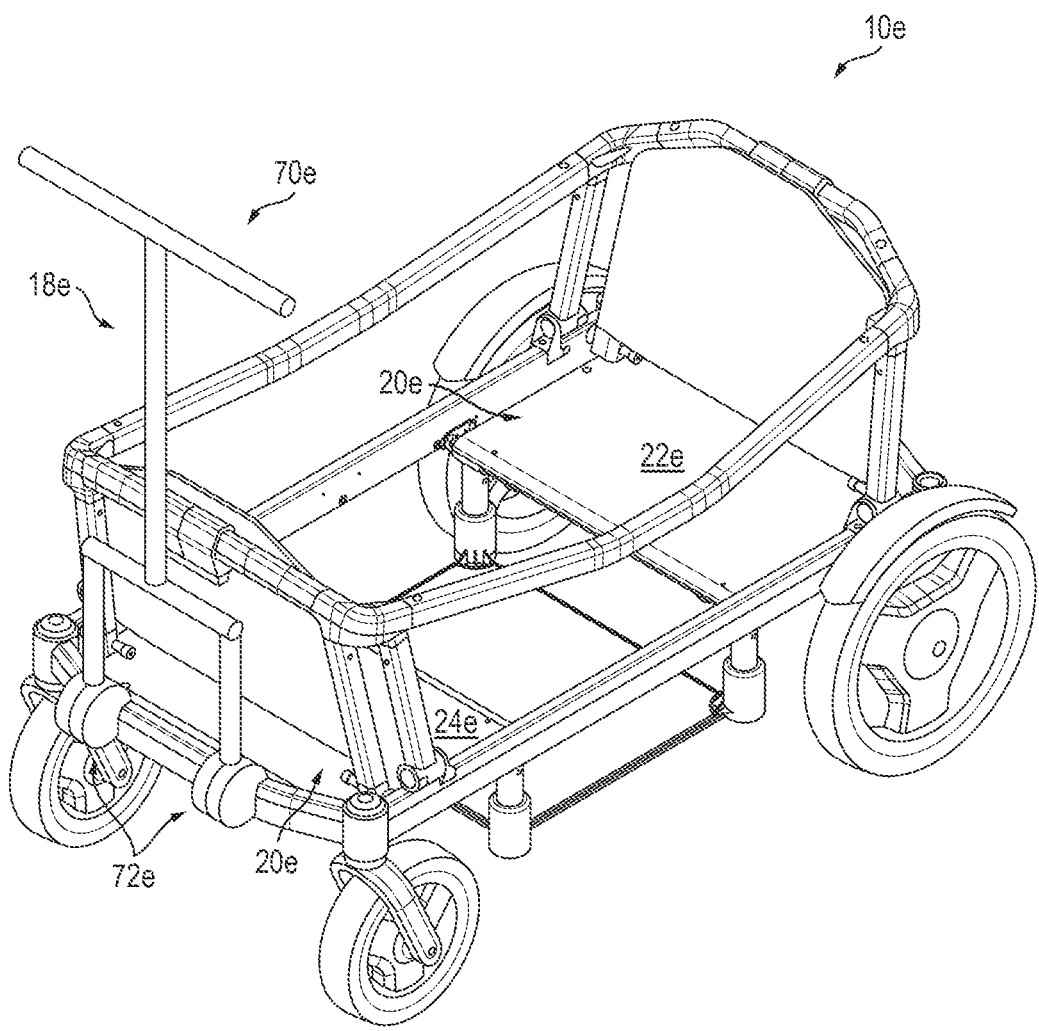
FIG. 43 shows a wagon with a position-lockable handle according to a seventh example embodiment of the invention.

FIG. 43 shows a wagon 10e with a position-lockable handle 70e according to a seventh example embodiment of the invention. In some aspects, for example as shown in FIG. 43, the wagon 10e may include a bottom surface 20e. The bottom surface may include a first seating surface 22e, a second seating surface 24e, and a footrest. The position-lockable handle 70e of this embodiment is similar to that of the sixth embodiment in that it includes a handle 18e, a pivot-lock mechanism 72e, and a lock-release mechanism (not shown). In this embodiment, however, the handle 18e is forked at its bottom and includes two of the pivot-lock mechanisms 72e to spread the load and facilitate a smooth pivoting motion. The lock-release mechanism can be of the same type is that described above.

Figure 44:
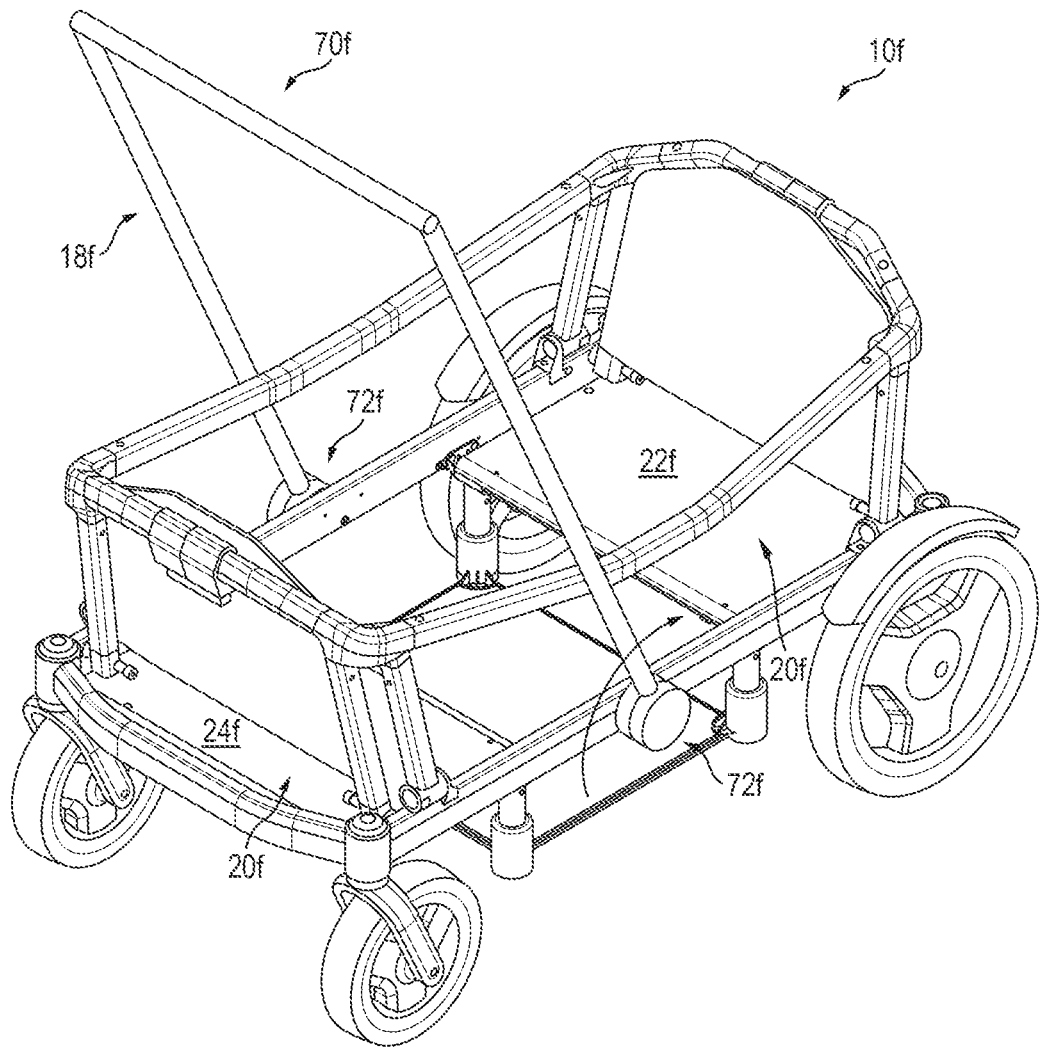
FIG. 44 shows a wagon with a position-lockable handle according to an eighth example embodiment of the invention.

FIG. 44 shows a wagon 10f with a position-lockable handle 70f according to an eighth example embodiment of the invention. In some aspects, for example as shown in FIG. 44, the wagon 10f may include a bottom surface 20f. The bottom surface 20f may include a first seating surface 22f, a second seating surface 24f, and a footrest. The position-lockable handle 70f of this embodiment is similar to that of the seventh embodiment in that it includes a handle 18e with two ends and with two pivot-lock mechanisms 72e mounting the handle ends to the base, and a lock-release mechanism (not shown). In this embodiment, however, the handle 18e is U-shaped, pivotally mounts to the wagon base at the middle of its sides, and has a length that is greater than one half of the base link, so that the pivotal travel of the handle is not limited by the front end wall of the wagon in its upright use position, and instead the handle can be swung over/around the upright walls through at least a 180° pivotal path for positioning at either end of the wagon and pulling the wagon from either end. The lock-release mechanism can be of the same type is that described above.

Figure 45:
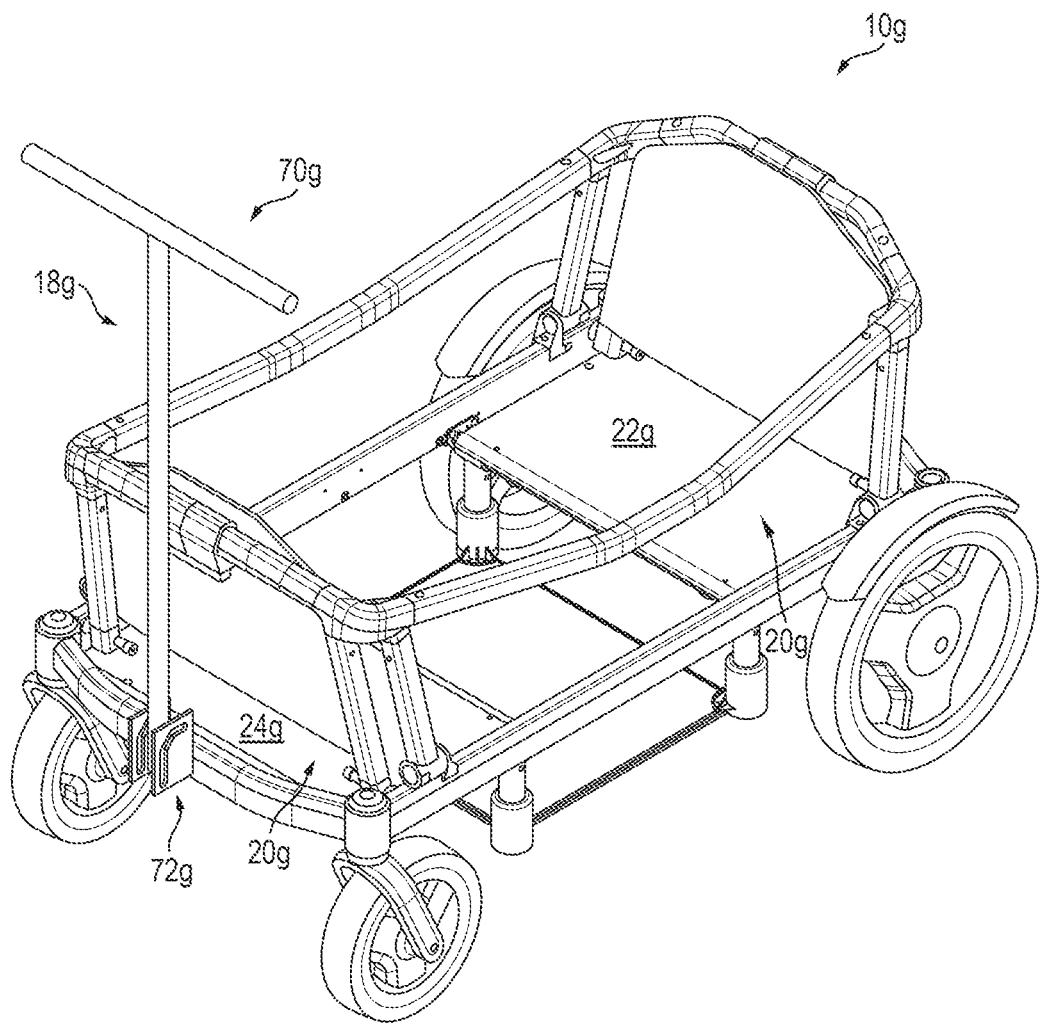
FIGS. 45-48 show a wagon with a position-lockable handle according to a ninth example embodiment of the invention.
Figure 46:
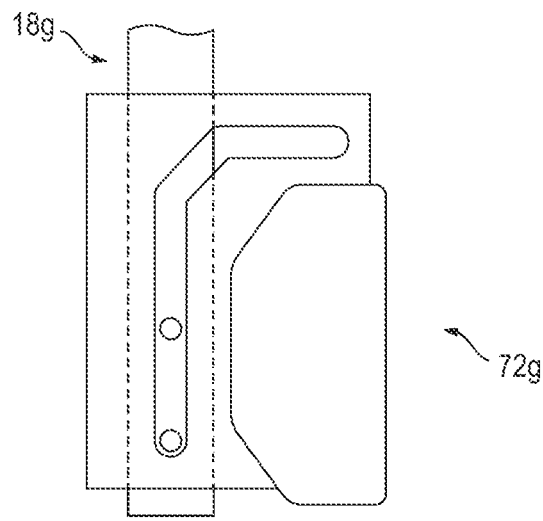
Figure 47:
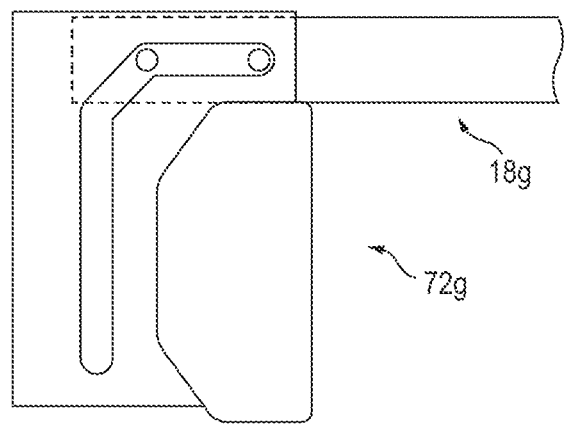
Figure 48:
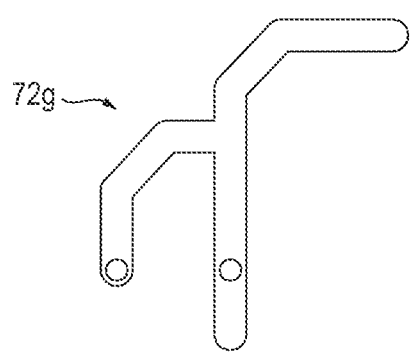

FIGS. 45-48 show a wagon 10g with a position-lockable handle 70g according to a ninth example embodiment of the invention. In some aspects, for example as shown in FIG. 45, the wagon 10g may include a bottom surface 20g. The bottom surface 20g may include a first seating surface 22g, a second seating surface 24g, and a footrest. The position-lockable handle 70g of this embodiment is similar to that of the sixth embodiment in that it includes a handle 18g, a pivot-lock mechanism 72g, and a lock-release mechanism (not shown). In this embodiment, however, the pivot-lock mechanism 72g includes at least one elongated guide track (e.g., a slot or channel formed in an inner wall of a plate or housing mounted to the wagon base) and at least one follower member (e.g., two spaced-apart pins extending outward from a bottom portion of the handle 18g and received and guided by the track). The handle 18g does not pivot about an axis, but instead the pin(s) slide within the slot(s) to permit folding and "locking" into one of multiple positions. The lock-release mechanism can be of the same type is that described above.

Figure 49:
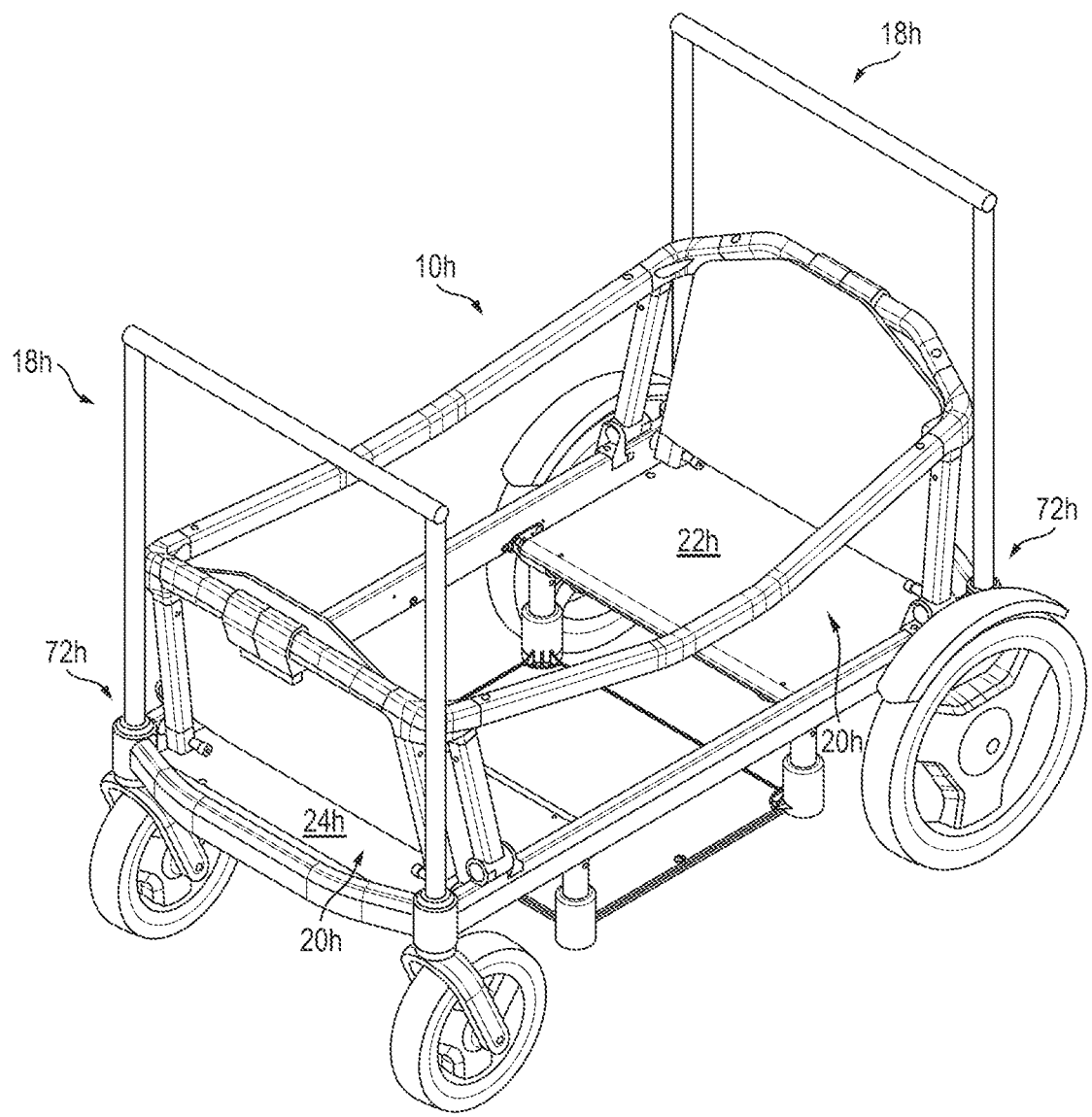
FIG. 49 shows a wagon with a position-lockable handle according to a tenth example embodiment of the invention.

FIG. 49 shows a wagon 10h with a position-lockable handle 70h according to a tenth example embodiment of the invention. In some aspects, for example as shown in FIG. 49, the wagon 10h may include a bottom surface 20h. The bottom surface 20h may include a first seating surface 22h, a second seating surface 24, and a footrest. The position-lockable handle 70h of this embodiment is similar to that of the sixth embodiment in that it includes a handle 18h, a pivot-lock mechanism 72h, and a lock-release mechanism (not shown). In this embodiment, however, the pivot-lock mechanism 72h removably mounts onto the wagon base, for example the bottom end of the handle tube 18h can lock into a receiver on the wagon frame. Pivotal articulation of the handle 18h can be incorporated into the handle end or the base receiver. Removable mounts can be provided at each end of the wagon base and two of the handles 18h provided, with the handles interchangeably mountable in the removable mount(s) at each end of the wagon base. The handles 18h can be generally U-shaped each with two mounting ends, and the removable mounts can be provided at the corners of the wagon, as depicted. The lock-release mechanism can be of the same type is that described above, or it can be provided by a detent connection between the handle and the wagon base that assists gravity in retaining the handle connection to the wagon during use but they can be overcome by applying an upward force.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A wagon assembly, comprising:
   at least one sidewall positionable in a use position and a stored position;
   a bottom surface coupled to the at least one sidewall, wherein the bottom surface and the at least one sidewall at least partially define a container;
   a plurality of wheels; and
   wherein the bottom surface further comprises a footwell feature positionable in an extended position and a storage position.

2. The wagon assembly of claim 1, wherein the bottom surface further comprises at least one seating surface.

3. The wagon assembly of claim 1, wherein the footwell feature comprises a footrest coupled to at least one footwell sidewall.

4. The wagon assembly of claim 2, wherein the footwell feature comprises a footrest coupled to at least one footwell sidewall and wherein, in the storage position, the footrest is positioned more proximate to the at least one seating surface of the wagon assembly than the footrest when the footwell feature is in the extended position.

5. The wagon assembly of claim 2, wherein the footwell feature comprises a plurality of upright elements, wherein, in the storage position, the plurality of upright elements are compressed such that a footrest of the footwell feature is positioned proximate to the at least one seating surface of the wagon assembly.

6. The wagon assembly of claim 1, further comprising a handle having a first use position and a stowed position; and
   wherein the handle includes a pivotal coupling for pivoting the handle between the first use position and the stowed position.

7. The wagon assembly of claim 6, wherein the handle is positionable in a second use position via the pivotal coupling for pivoting the handle between the first use position and the second use position.

8. The wagon assembly of claim 6, further comprising a handle locking mechanism for locking the handle in the first use position.

9. The wagon assembly of claim 8, wherein the handle locking mechanism is an automatic handle locking mechanism for automatically locking the handle in the first use position.

10. A method of converting a wagon from a pushing orientation to a pulling orientation, comprising:
    providing the wagon comprising:
      at least one sidewall positionable in a use position and a stored position;
      a bottom surface coupled to the at least one sidewall, wherein the bottom surface and the at least one sidewall at least partially define a container; and
      a plurality of wheels;
      wherein the bottom surface includes a footwell feature positionable in an extended position and a storage position;
    releasing a handle of the wagon from a locking mechanism retaining the handle in a first position for pushing the wagon;
    pivoting the handle from the first position to a second position for pulling the wagon; and
    wherein, in the second position, the handle may travel through a pivotal path about a pivot point.

11. The method of claim 10 wherein the step of releasing the handle of the wagon from the locking mechanism comprises:
    activating the locking mechanism such that the locking mechanism is in an unlocked position; and
    pivoting the handle in a direction away from the locking mechanism and towards the second position.

12. A wagon assembly comprising:
    a peripheral sidewall coupled to a base for at least partially defining a container;
    a plurality of wheels;
    a footwell feature, wherein the footwell feature is moveable between a first position and a second position;
    a handle that is repositionable between a first use position, a second use position, and a storage position; and
    a lock mechanism that locks the handle in the first use position, wherein the handle is repositionable between the first use position and the second use position by pivoting the handle about a pivot point.

13. The wagon assembly of claim 12, wherein the footwell feature includes a footrest and a plurality of footwell sidewalls defining a footwell interior.

14. The wagon assembly of claim 13, wherein the base includes a peripheral frame.

15. The wagon assembly of claim 13, wherein the footwell feature is coupled to the base.

16. The wagon assembly of claim 12, wherein the first position of the footwell feature is a storage position and the second position of the footwell feature is a use position.

17. The wagon assembly of claim 13, wherein the plurality of footwell sidewalls comprise a fabric material.

18. The wagon assembly of claim 12, wherein the lock mechanism is an automatic lock mechanism that automatically locks the handle in the first use position.

19. The wagon assembly of claim 12, wherein the handle includes a pivotal coupling for pivoting the handle between the first use position and the storage position.

20. The wagon assembly of claim 12, wherein the lock mechanism is an automatic lock mechanism that automatically locks the handle in the storage position.

21. A wagon assembly comprising:
    at least one upright wall for at least partially defining a container;
    a handle that is repositionable between a first use position and a second use position and comprising:
      a pair of lateral portions;
      a central portion extending between the pair of lateral portions;
      wherein the handle is movable about a pair of pivot points and repositionable between the first use position and the second use position by pivoting the handle about the pair of pivot points, and wherein the handle extends at least partially beyond a first end of the container when in the first use position, and wherein the handle extends at least partially beyond a second end of the container opposite the first end when in the second use position;

at least one lock mechanism that locks the handle in the first use position; and at least one pivot mechanism that pivotally couples the handle to a peripheral frame of the wagon assembly, wherein the at least one pivot mechanism defines a first pivot point of the pair of pivot points.

22. The wagon assembly of claim 21, wherein the pivot mechanism comprises a bracket and a bolt.

23. The wagon assembly of claim 21, wherein the at least one lock mechanism is integrated with the at least one pivot mechanism to form a pivot-lock mechanism that both pivotally connects the handle to the peripheral frame and locks the handle in the first use position.

24. The wagon assembly of claim 21, wherein the at least one lock mechanism includes a position-defining member, connected to the peripheral frame, that defines multiple serial lock notches.

25. The wagon assembly of claim 24, wherein the at least one lock mechanism further includes at least one lock protrusion that is movably mounted to the handle and that releasably engages the position-defining member.

26. The wagon assembly of claim 21, wherein the handle is connected to the peripheral frame proximate to the second end of the container.

27. The wagon assembly of claim 21, wherein the handle is connected to the peripheral frame proximate to a midpoint between the first end and the second end of the container.

28. The wagon assembly of claim 21, further comprising:
a first pivot mechanism for pivotally coupling a first lateral portion of the pair of lateral portions to a first side of the peripheral frame and a second pivot mechanism for pivotally coupling a second lateral portion to a second side of the peripheral frame.

29. The wagon assembly of claim 21, wherein the pair of pivot points are positioned proximate to the second end of the container.

30. The wagon assembly of claim 21, wherein the handle is generally U-shaped.

31. The wagon assembly of claim 21, wherein the handle further comprises a storage position.

32. The wagon assembly of claim 21, wherein, the handle moves between the first use position and the second use position by rotating at least 180 degrees about the pair of pivot points.

33. The wagon assembly of claim 21, further comprising a footwell having a footrest connected to at least one footwell sidewall, and wherein the at least one footwell sidewall comprises a flexible material that is collapsible.

34. The wagon assembly of claim 21, wherein the first use position is configured for pushing the wagon assembly.

35. A wagon assembly comprising:
a peripheral frame;
at least one seating surface;
first and second substantially parallel end walls and first and second substantially parallel side walls collectively, with the at least one seating surface, defining a container portion;
a handle having first and second generally parallel lateral portions and a central portion extending between the first and second generally parallel lateral portions, wherein the first and second generally parallel lateral portions and the central portion together define a generally U-shape of the handle;
wherein the first and second generally parallel lateral portions are connected to the peripheral frame at first and second pivot points;
wherein the handle is repositionable between a first use position and a second use position by pivoting the handle about the first and second pivot points;
wherein at least a portion of the handle extends beyond the first end wall when in the first use position, and at least a portion of the handle extends beyond the second end wall when in the second use position; and
at least one lock mechanism that locks the handle in the first use position.

36. The wagon assembly of claim 32, wherein the first use position is configured for pushing the wagon assembly.

37. The wagon assembly of claim 32, further comprising a footwell comprised of a flexible material that is collapsible.

38. The wagon assembly of claim 3, wherein the at least one footwell sidewall comprises a fabric material.

39. The wagon assembly of claim 38, wherein the fabric material is collapsible for positioning the footwell feature in the storage position.

* * * * *